(12) United States Patent
Tagra et al.

(10) Patent No.: US 11,482,041 B2
(45) Date of Patent: Oct. 25, 2022

(54) IDENTITY OBFUSCATION IN IMAGES UTILIZING SYNTHESIZED FACES

(71) Applicant: ADOBE INC., San Jose, CA (US)

(72) Inventors: Sanjeev Tagra, Redmond, WA (US); Sachin Soni, New Delhi (IN); Ajay Jain, Ghaziabad (IN); Ryan Rozich, Austin, TX (US); Jonathan Roeder, Round Rock, TX (US); Arshiya Aggarwal, New Delhi (IN); Prasenjit Mondal, West Bengal (IN)

(73) Assignee: ADOBE INC., San Jose, CA (US)

( * ) Notice: Subject to any disclaimer, the term of this patent is extended or adjusted under 35 U.S.C. 154(b) by 49 days.

(21) Appl. No.: 17/076,002

(22) Filed: Oct. 21, 2020

(65) Prior Publication Data
US 2022/0121839 A1  Apr. 21, 2022

(51) Int. Cl.
*G06V 40/16* (2022.01)
*G06T 5/50* (2006.01)
(Continued)

(52) U.S. Cl.
CPC ......... *G06V 40/171* (2022.01); *G06K 9/6215* (2013.01); *G06T 5/50* (2013.01);
(Continued)

(58) Field of Classification Search
CPC ............ G06K 9/00281; G06K 9/3216; G06K 9/00288; G06K 9/6215; G06K 9/00248; G06T 5/50; G06T 2200/24; G06T 2207/20216; G06T 2207/30196; G06T 2207/30232; G06T 5/005; G06V 40/171;
(Continued)

(56) References Cited

U.S. PATENT DOCUMENTS

2010/0183228 A1* 7/2010 Matsuzaka ......... G06K 9/00248
382/195
2019/0171866 A1* 6/2019 Lu .................... G06K 9/00248
(Continued)

OTHER PUBLICATIONS

Gauthier, J. (2014). Conditional generative adversarial nets for convolutional face generation. Class Project for Stanford CS231N: Convolutional Neural Networks for Visual Recognition, Winter semester, 2014(5), 2.

(Continued)

*Primary Examiner* — Phuoc Tran
(74) *Attorney, Agent, or Firm* — Shook, Hardy & Bacon LLP

(57) ABSTRACT

Methods, apparatus, and systems are provided for obfuscating facial identity in images by synthesizing a new facial image for an input image. A base face is detected from or selected for an input image. Facial images that are similar to the base face are selected and combined to create a new facial image. The new facial image is added to the input image such that the input image includes a combination of the base face and the new facial image. Where no base face is detected in the input image, a base face is selected from reference facial images based at least on pose keypoints identified in the input image. After a new facial image is generated based on the selected base face, a combination of the new facial image and the base facial image are added to the input image by aligning one or more pose keypoints.

20 Claims, 22 Drawing Sheets

(51) Int. Cl.
*G06K 9/62* (2022.01)
*G06V 10/24* (2022.01)

(52) U.S. Cl.
CPC .......... *G06V 10/245* (2022.01); *G06V 40/165* (2022.01); *G06V 40/172* (2022.01)

(58) Field of Classification Search
CPC ... G06V 10/245; G06V 40/165; G06V 40/172
See application file for complete search history.

(56) References Cited

U.S. PATENT DOCUMENTS

| 2020/0372243 | A1* | 11/2020 | Tai | G06N 3/0454 |
| 2021/0201458 | A1* | 7/2021 | Wu | G06T 5/50 |
| 2021/0209732 | A1* | 7/2021 | Hu | G06N 3/08 |

OTHER PUBLICATIONS

Li, T., & Lin, L. (2019). Anonymousnet: Natural face de-identification with measurable privacy. In Proceedings of the IEEE Conference on Computer Vision and Pattern Recognition Workshops.

Wu, Y., Yang, F., Xu, Y., & Ling, H. (2019). Privacy-protective-GAN for privacy preserving face de-identification. Journal of Computer Science and Technology, 34(1), 47-60.

Sun, Q., Ma, L., Joon Oh, S., Van Gool, L., Schiele, B., & Fritz, M. (2018). Natural and effective obfuscation by head inpainting. In Proceedings of the IEEE Conference on Computer Vision and Pattern Recognition (pp. 5050-5059).

Sun, Q., Tewari, A., Xu, W., Fritz, M., Theobalt, C., & Schiele, B. (2018). A hybrid model for identity obfuscation by face replacement. In Proceedings of the European Conference on Computer Vision (ECCV) (pp. 553-569).

Larsen, A. B. L., Sonderby, S. K., Larochelle, H., & Winther, O. (Jun. 2016). Autoencoding beyond pixels using a learned similarity metric. In International conference on machine learning (pp. 1558-1566). PMLR.

Tewari, A., Zollhofer, M., Kim, H., Garrido, P., Bernard, F., Perez, P., & Theobalt, C. (2017). Mofa: Model-based deep convolutional face autoencoder for unsupervised monocular reconstruction. In Proceedings of the IEEE International Conference on Computer Vision Workshops (pp. 1274-1283).

Liu, L., Li, S., Chen, Y., & Wang, G. (2018). X-gans: Image reconstruction made easy for extreme cases. arXiv preprint arXiv:1808.04432.

Natsume, R., Yatagawa, T., & Morishima, S. (2018). Rsgan: face swapping and editing using face and hair representation in latent spaces. arXiv preprint arXiv:1804.03447.

Chang, H., Lu, J., Yu, F., & Finkelstein, A. (2018). Pairedcyclegan: Asymmetric style transfer for applying and removing makeup. In Proceedings of the IEEE conference on computer vision and pattern recognition (pp. 40-48).

Mosaddegh, S., Simon, L., & Jurie, F. (Nov. 2014). Photorealistic face de-identification by aggregating donors' face components. In Asian Conference on Computer Vision (pp. 159-174). Springer, Cham.

\* cited by examiner

IDENTITY OBFUSCATION IN IMAGES UTILIZING SYNTHESIZED FACES

BACKGROUND

With the increase in sophistication of facial recognition technologies, users who upload images of their faces may be vulnerable to identity theft through their facial identities. As such, users may desire to obscure their identities in these such images. For example, when users of ecommerce platforms post photographs of purchased goods to provide feedback, they often either crop the photographs so that the individuals' faces are not included or obscure their faces by blurring them or covering them with a digital object (e.g., a black box). In another example, users uploading images on social media may be comfortable showing their own faces but crop out, blur, or cover faces of other individuals to protect their privacy. Such cropping, blurring, and/or covering may result in a less aesthetically pleasing image. Additionally, many users are unaware of the vulnerabilities to their privacy and identify and, thus, upload images and videos without using any techniques to protect their facial identities.

Some existing techniques for protecting facial identity involve superimposing a stock image over a user's uploaded image to change the face in the user uploaded image. While this technique may protect the user's identity, it does so at the expense of the privacy of the actual individual in the other image used. Further, some existing methods utilizing Generative Adversarial Networks (GANs) may synthesize a new face instead of using a stock image, but these techniques have been found to produce blurred and unsatisfactory results. Additionally, existing tools do not work when the user's head is completely cropped out of the image.

SUMMARY

Embodiments of the present invention are directed towards systems, computerized methods, and computer storage media with instructions for performing methods to create a new facial image and update the input image with the new facial image to protect the facial identity of a person depicted in the input image. In embodiments of the disclosed technology, a base face is detected from a user's input image. Facial images that are similar to the base face are selected and combined to create a new facial image. In exemplary embodiments, the new facial image is aligned with and blended with the base face, which allows some aesthetics of the base face of the input image to be visible. The new facial image, in combination with the base face, is added to the input image to replace the base face detected in the input image.

Some embodiments of the disclosed technology generate a new facial image for an input image even when no face is detected within the input image, such as when a face is cropped out, blurred, or blocked. Instead of using a base face extracted from the input image, a base face is selected from a set of reference facial images. In exemplary embodiments, the base face is selected by determining a likely face direction for the input image based on pose keypoints on the input image and selecting a base face with a matching face direction. In some embodiments, gender and/or skin color are also used to select the base face. With the selected base face, a new facial image is synthesized and combined with the base face in the same manner as if the base face was extracted from the input image. To update the input image with the new user facial image, pose keypoints are estimated for the new user facial image, and at least one pose keypoint of the new user facial image is aligned with a corresponding pose keypoint of the input image. Additionally, in exemplary aspects, where a face is not detected, a background reconstruction process is performed to generate additional background of the input image over which the new user facial image can be added.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
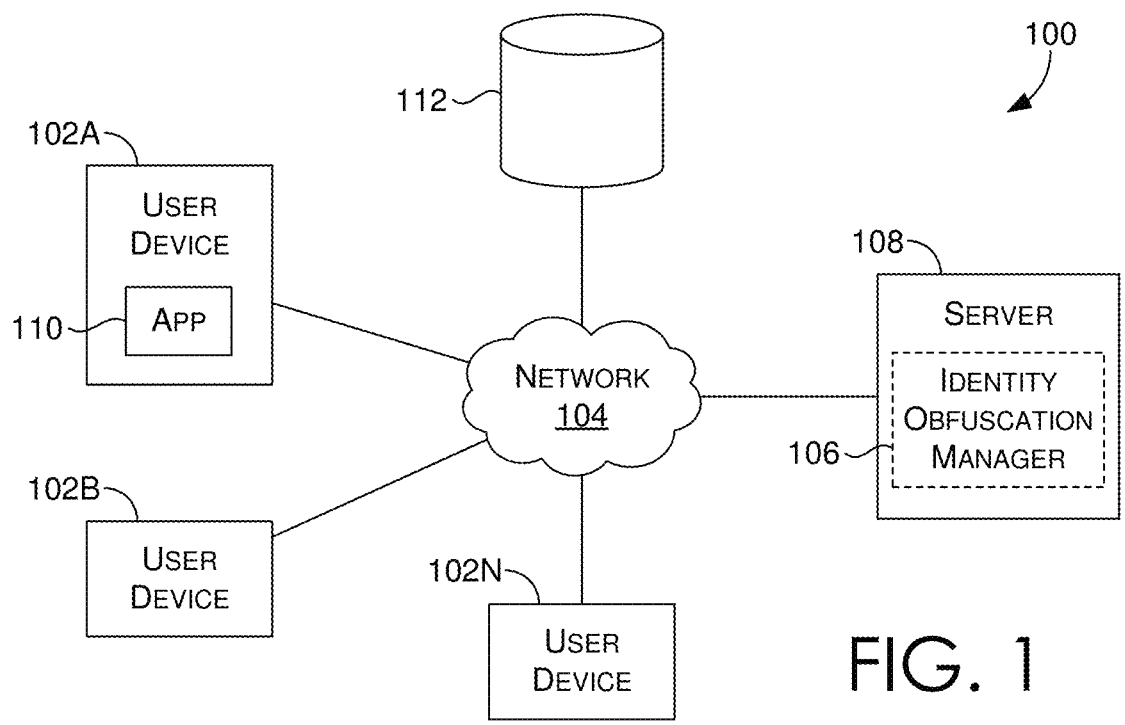
FIG. 1 depicts an example configuration of an operating environment in which implementations of the present disclosure can be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Definitions

Various terms are used throughout this description. Definitions of some terms are included below to provide a clearer understanding of the ideas disclosed herein:

The term "image" is used herein to refer to data captured from a camera. Images may comprise frames from video files or video feeds or one or more photographs, including LDR and HDR image files. Images may comprise data captured by a camera and displayed on a user device in real time even if the data is not stored. The term "image," as used herein, may refer to data captured together from a single camera or to a combination of image data captured separately.

The term "input image" is used herein to refer to an image that is input, selected, or otherwise identified by a user. The term "facial image" is used herein to refer to image data that depicts at least part of a person's face. Similarly, the term "reference facial image" is used herein to refer to image data depicting a person's face that is stored and retrieved from a database, rather than being provided by a user. The term "similar facial image" is used herein to refer to a reference facial image that is determined to be similar to another facial image. The term "new facial image" is used herein to refer to a facial image that is created by combining image data from other facial images, such as by combining similar facial images. Similarly, the term "new user facial image" is used herein to refer to image data that is a combination of the new facial image and a base facial image The term "base facial image" is used herein to refer to a facial image that is utilized to synthesize the new facial image for an input image. The base facial image may either be extracted from the input image or may be selected from a set of reference facial images. A base facial image is sometimes referred to herein as "a base face", and it should be understood that reference to a "base face" describes image data representing a face or a portion thereof, rather than describing the actual face itself.

The term "output image space" is used herein to refer to a fixed optical space coordinatizing where images, such as the similar facial images, are combined. The output image space is of a predetermined size with pixels initially assigned to zero faces.

The term "facial landmark" is used herein to refer to a location of a particular region of a human face, such as the mouth, eye brows, nose, eyes, jaw, etc. A facial landmark may be in the form of 2D or 3D coordinates of image that correspond to the particular localized facial region.

The term "pose keypoint" is used herein to refer to a localization of a particular body part, which may be a joint such as elbows, wrists, etc., on a person depicted in an image. A pose keypoint may be in the form of 2D or 3D coordinates of the image that correspond to a particular body part.

Overview

Embodiments of the present disclosure are directed towards obfuscating facial identity in an input image by synthesizing a new facial image and combining the new facial image with the uploaded image. Users often upload and post images of themselves or other people online, such as on social media platforms or when leaving a user review on an ecommerce platform. With the increase in sophistication of facial recognition technologies, the identities of people in the images are vulnerable to identity theft or other privacy concerns. While it may be possible to limit the people who can view such images online in some contexts, it is not always possible to do so, such as when a user is posting an image as part of user feedback on an ecommerce website. Additionally, even where the viewers can be restricted by a user, a user may upload an image that includes the face of another person and may want to protect the privacy of only that person. To obscure the identity of themselves or others, users often either crop the images so that the individuals' faces are not included or obscure their faces by blurring them or covering them with a digital object (e.g., a black box). Such cropping, blurring, and/or covering, however, results in a less aesthetically pleasing image such that protecting facial identity sacrifices the quality of the images. Additionally, some users are unaware of the vulnerabilities to their privacy and identify and, thus, upload images without using any of these manual techniques to protect their facial identities. As such, there is a need for alternative technologies to obfuscate an individual's facial identity within an image while maintaining the integrity of the image.

Some existing techniques for protecting facial identity involve superimposing a stock image of a person's face over a user's uploaded image to change the face in the user uploaded image. While this technique may protect the user's identity, it does so at the expense of the privacy of the actual individual in the other image used. Some existing methods utilizing Generative Adversarial Networks (GANs) synthesize a new face instead of using a stock image, but these techniques have been found to produce blurred and unsatisfactory results. Additionally, existing tools do not work when the user's head is completely cropped out of the image and, therefore, cannot provide more aesthetically pleasing techniques when a user has already attempted to manually obfuscate their identity.

Accordingly, embodiments of the present invention are directed to facilitating realistic and aesthetically pleasing facial identity obfuscation. At a high level, when an input image is received from or by the direction of a user, a base face for the input image is determined. Face detection technologies are applied to determine if the input image depicts a face, which will be used as the base face. If not, such as when the face is cropped out of the image, is blurred, or is otherwise obscured, the base face is selected from reference facial images. Based on the base face for an input image, a set of similar facial images are selected and used to synthesize a new facial image. The new facial image is combined with the base face, and the input image is updated with the combination of the new facial image and base face, which helps to retain some aesthetics of the input image.

Generating the new facial image for the base face includes selecting a set of similar facial images, aligning the similar facial images, and combining them. The similar facial images are selected by extracting facial features from the base face and comparing them to facial features of reference facial images, such as by finding the Euclidean distance between facial feature vectors. The top n most similar reference facial images are selected for the set of similar facial images. In an exemplary embodiment, six similar facial images are selected for a base face. Facial landmarks of the similar facial images are then detected and utilized to align the similar facial images together over an output image space. Once aligned, the similar facial images are combined by averaging pixel intensities, which creates the new facial image. The new facial image is synthesized specifically for the input image such that it will have some similarities with base face. Additionally, because the new facial image is synthesized from multiple similar facial images, it does not expose the identity of an actual individual in one of a reference image.

The new facial image is aligned and combined with the base face of the input image. This alignment may be done by aligning facial landmarks of the new facial image and the base face. When aligned, the new facial image and the base face overlay one another, and alpha blending is applied so that the resulting combination, which is referred to as a new user facial image, is a visual combination of the newly synthesized facial image and the base face. In exemplary embodiments, the amount of alpha blending may be set and/or adjusted by the user, giving the user freedom to determine a desired balance between obscuring the base face and allowing the more aesthetics of the base face to come through in the new user facial image. The new user facial image is added to the input image so that it aligns to create a seamless transition with the rest of the body in the input image, and another blending process, such as Poisson blending, is performed.

As stated, when a face is not detected within the input image, a base face may be selected from a set of reference facial images. The base face is selected by determining pose keypoints on at least the portion of the body that is depicted in the input image, and using the pose keypoints to determine a likely face direction for the input image. As an example, a face direction may be front facing, right side facing, left side facing, or backward facing. The determined face direction is utilized to select a base face that matches the face direction. In some embodiments, gender and/or skin color are also determined for the input image and utilized to select a base face. When a base face is selected from the set of reference facial images, a new facial image is synthesized and combined with the base face in the same manner as if the base face was extracted from the input image. To update the input image with the new user facial image, pose keypoints are estimated for the new user facial image, and at least one pose keypoint of the new user facial image is aligned with a corresponding pose keypoint on the input image. Additional blending, such as Poisson blending, may be performed. Additionally, in exemplary aspects, where a face is not detected, a background reconstruction process is performed to generate additional background on the input image over which the new user facial image can be added.

Exemplary Identity Obfuscation System

FIG. 1 depicts an example configuration of an environment in which some implementations of the present disclosure can be employed to obfuscate facial identity in an input image. It should be understood that the illustrated environment and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 21.

It should be understood that environment 100 shown in FIG. 1 is an example of one suitable operating environment. Among other components not shown, environment 100 includes a number of user devices, such as user devices 102a and 102b through 102n, network 104, database 112, and server(s) 108. Each of the components shown in FIG. 1 may be implemented via any type of computing device, such as one or more of computing device 2100 described in connection to FIG. 21, for example. These components may communicate with each other via network 104, which may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within environment 100 within the scope of the present disclosure. Each may comprise a single device or multiple devices cooperating in a distributed environment.

User devices 102a through 102n may be any type of computing device capable of being operated by a user. For example, in some implementations, user devices 102a through 102n are the type of computing device described in relation to FIG. 21. By way of example and not limitation, a user device may be embodied as a personal computer (PC), a laptop computer, a mobile device, a smartphone, a tablet computer, a smart watch, a camera, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device with a built-in camera or capable of being connected to a camera.

User devices 102a through 102n may include one or more processors and one or more computer-storage media. The computer-storage media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

Application 110 may generally be any application capable of facilitating the exchange of information between user devices 102a through 102n and the server(s) 108 in carrying out steps for synthesizing a new face for a user image. In some implementations, application 110 comprises a web application that can run in a web browser and could be hosted at least partially on the server-side of environment 100. In addition, or instead, application 110 may comprise a dedicated application, such as an application having image processing functionality. In some cases, application 110 is integrated into the operating system (e.g., as a service). It is, therefore, contemplated herein that "application" be interpreted broadly.

As described herein, server 108 facilitates identity obfuscation by synthesizing a new face to be combined with the user image via identity obfuscation manager 106. Server 108 includes one or more processors, and one or more computer-storage media. The computer-storage media includes computer-readable instructions executable by the one or more processors. The instructions may optionally implement one or more components of identity obfuscation manager 106, described in additional detail below. Embodiments of identity obfuscation manager 106 generate a new face for a user input image, which may or may not originally depict a face, and combines the generated new face with the input image.

For cloud-based implementations, the instructions on server 108 may implement one or more components of identity obfuscation manager 106, and application 110 may be utilized by a user to interface with the functionality implemented on server(s) 108. In some cases, application 110 comprises a web browser. In particular, application 110 may comprise a web browser application that facilitates a user's interactions with a website, such as an ecommerce website or social media website, run on an embodiment of server 108. Alternatively, application 110 may comprise an app, such as an ecommerce app or social media app, that communicates with server 108 hosting identity obfuscation manager 106. In other cases, server 108 may not be required. For example, the components of identity obfuscation manager 106 may be implemented completely on a user device, such as user device 102a. In this case, identity obfuscation manager 106 may be embodied at least partially by the instructions corresponding to application 110 and may be provided as an add-on or plug-in to application 110. Thus, it should be appreciated that identity obfuscation manager 106 may be provided via multiple devices arranged in a distributed environment that collectively provide the functionality described herein. For example, identity obfuscation manager 106 may partially reside on a user device, such as user device 102a, and partially on server 108. Additionally, other components not shown may also be included within the distributed environment. Furthermore, identity obfuscation manager 106 may at least partially be embodied as a cloud computing service.

Environment 100 of FIG. 1 further may include database 112, which may store computer instructions (e.g., software program instructions, routines, or services), data, and/or models used in embodiments described herein. In some implementations, database 112 stores information or data received via the various components of identity obfuscation manager 106 and provides the various components with access to that information or data as needed. Although depicted as a single component, database 112 may be embodied as one or more data stores. Further, the information in database 112 may be distributed in any suitable manner across one or more data stores for storage (which may be hosted externally or internally).

Figure 2:
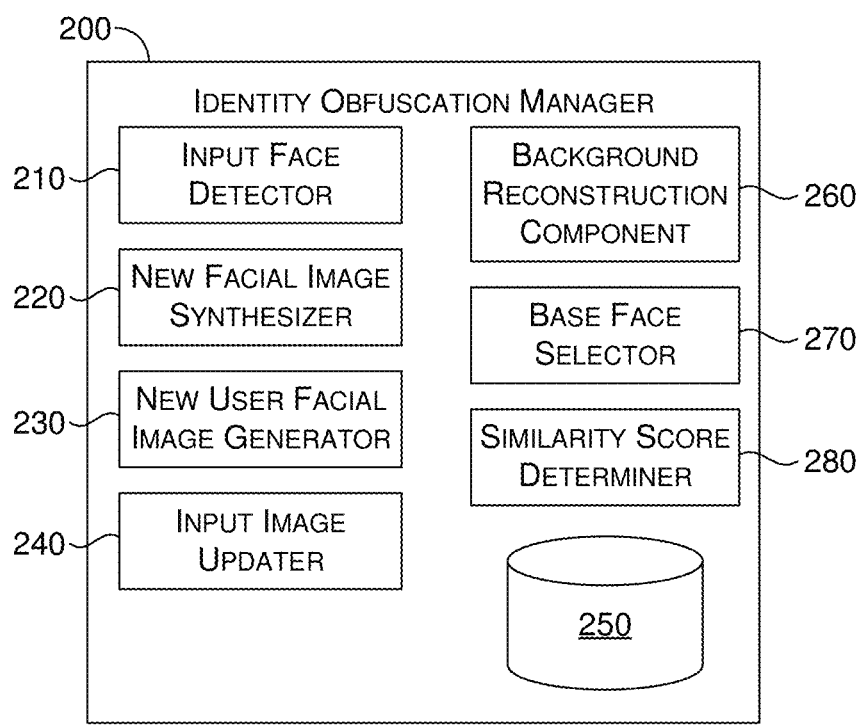
FIG. 2 depicts aspects of an example identity obfuscation manager, in accordance with various embodiments of the present disclosure.

Referring to FIG. 2, aspects of an illustrative identity obfuscation manager 200 are shown, in accordance with various embodiments of the present disclosure. At a high level, identity obfuscation manager, which may be implemented within an operating environment as described with respect to identity obfuscation manager 106 in environment 100, facilitates operations for obfuscating facial identity in a user image by synthesizing a new face (embodied as a new facial image) to be combined with the user's input image. Embodiments of identity obfuscation manager 200 includes input face detector 210, new facial image synthesizer 220, new user facial image generator 230, input image updater 240, and data store 250. Further, some embodiments of identity obfuscation manager 200 include background reconstruction component 260 and base face selector 270. Additionally, some embodiments include similarity score determiner 280. Embodiments of the identity obfuscation manager 200 may be implemented as identity obfuscation manager 106 within operating environment 100 of FIG. 1. As such, the foregoing components of identity obfuscation manager 200 may be integrated into any suitable combination of user devices 102a and 102b through 102n, and server(s) 208.

Figure 3:
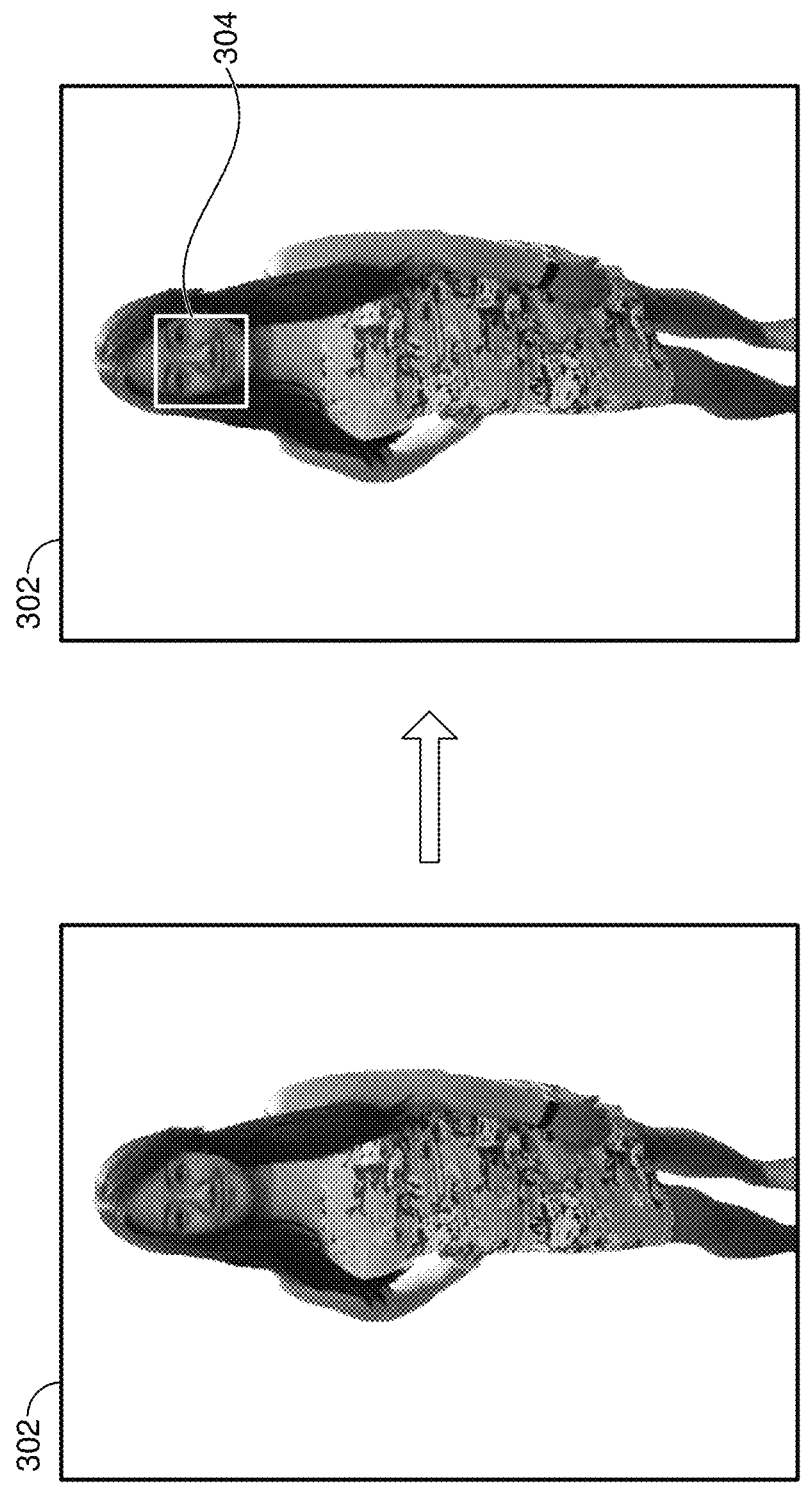
FIG. 3 depicts an input and an output of an example input face detector, in accordance with various embodiments of the disclosure.

Input face detector 210 is generally responsible for detecting a face of an individual within an input image. More specifically, input face detector 210 detects an area of an input image in which a face is depicted. In some embodiments, the input image is received by input face detector 210 by a user directly uploading the input image from a user device, such as user device 102a of FIG. 1. In other embodiments, the input image is retrieved or otherwise received from cloud data storage or another data store remote from the user device upon selection or other indication of the input image from the user device. From the input image, input face detector 210 may output a bounding box defining the area of the input image in which a face is detected. For example, FIG. 3 depicts an example input image 302 that depicts a person. From input image 302, an embodiment of input face detector 210 may detect that input image 302 includes a face and determine the position of the face within the input image 302 as represented by bounding box 304. In some embodiments, input face detector 210 may also output one or more facial landmarks, such as eyes, nose, and left and right side of the mouth.

Figure 4A:
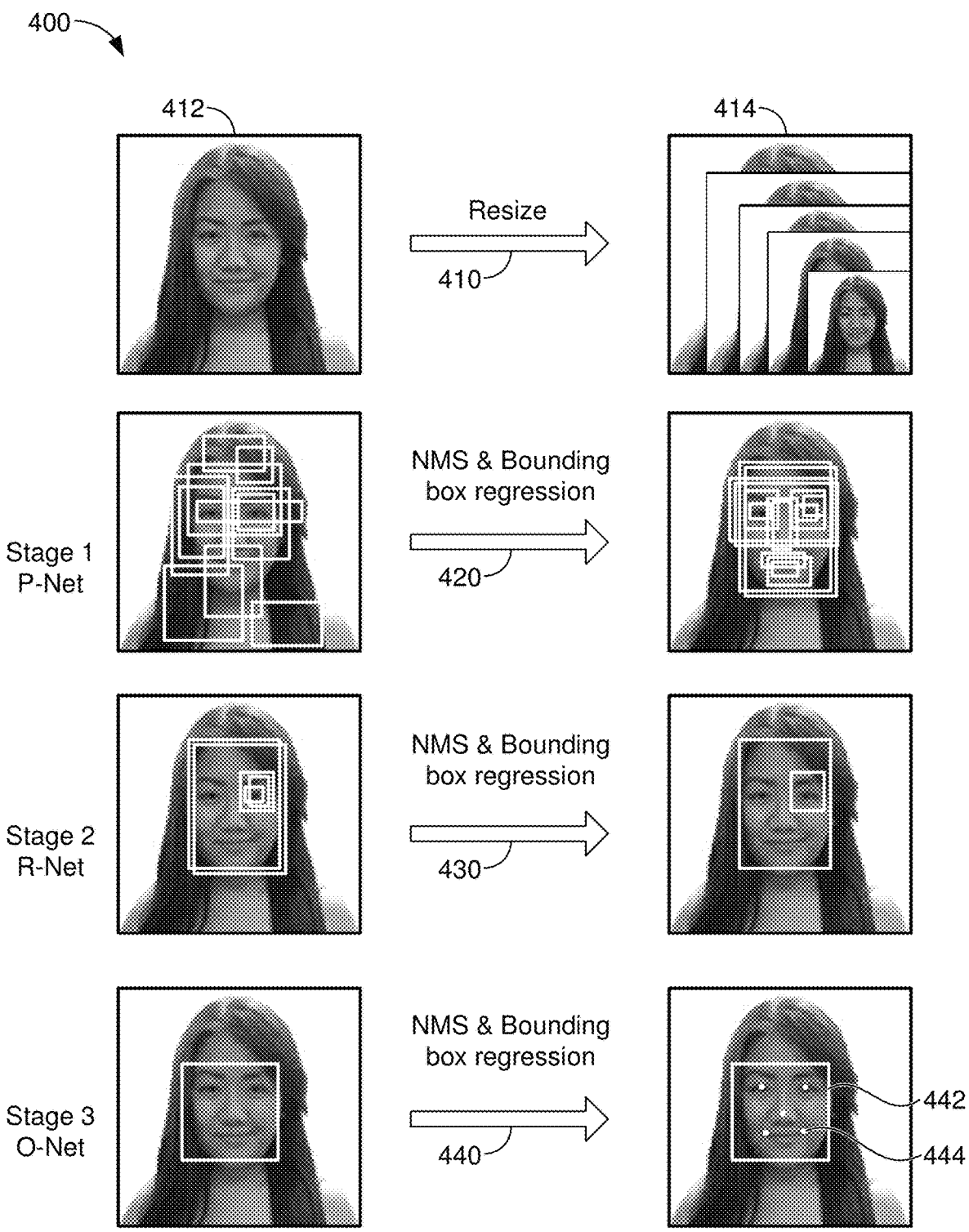
FIG. 4A depicts an example facial detection process, in accordance with various embodiments of the disclosure.

To detect a face within an input image, input face detector 210 utilizes a set of heuristics rules and/or one or more machine learning models. In some embodiments, face detector 210 utilizes a multi-task cascaded convolutional neural network (MTCNN). MTCNN includes a series of three networks (which may be referred to as stages) and may include a process for resizing an input image prior to applying the stages. An example process 400 utilizing MTCNN is depicted in FIG. 4A. Process 400 includes, at preliminary stage 410, resizing an input image 412. Resizing may include rescaling input image 412 into different resolutions to form an image pyramid 414, which is a set of images corresponding to the input image 412 but having different resolutions. Image pyramid 414 is input into MTCNN such that each image of image pyramid 414 is run through the three network stages of MTCNN. A first stage 420 comprises a proposal network (P-Net), which is a shallow convolutional neural network (CNN) that identifies candidates for the most likely facial regions within the input image 412. Candidates may be calibrated using estimated bounding box regression, and certain overlapped candidates may be merged using non-maximum suppression (NMS). Candidates identified in the first stage 420 are input into a second stage 430, which comprises a refine network (R-Net). R-Net is a CNN that filters out the false candidates. The second stage 430 may also include NMS and bounding box regression to calibrate the determined bounding boxes. A third stage 440 comprises an output network (O-Net), which is a CNN that detects particular details within the facial region candidates remaining after the second stage 430. In exemplary aspects, O-Net outputs a final bounding box 442 for a face and select facial landmarks 444. The facial landmarks output by O-Net are landmarks for the eyes, nose and mouth.

In some embodiments, the bounding box output from MTCNN is an initial bounding box, and input face detector 210 applies padding around the initial bounding box coordinates to enlarge the bounding box enclosing the face of the input image. In exemplary embodiments, the amount added to the height of the bounding box is the same amount added to the width. For example, padding may include adding five percent of the initial bounding box height and five percent of the initial bounding box width. It is contemplated that other values may be used for padding the bounding box. Utilizing the final bounding box for an input image, a base facial image may be extracted from the input image for further processing by one or more components of identity obfuscation manager 200.

Figure 4B:
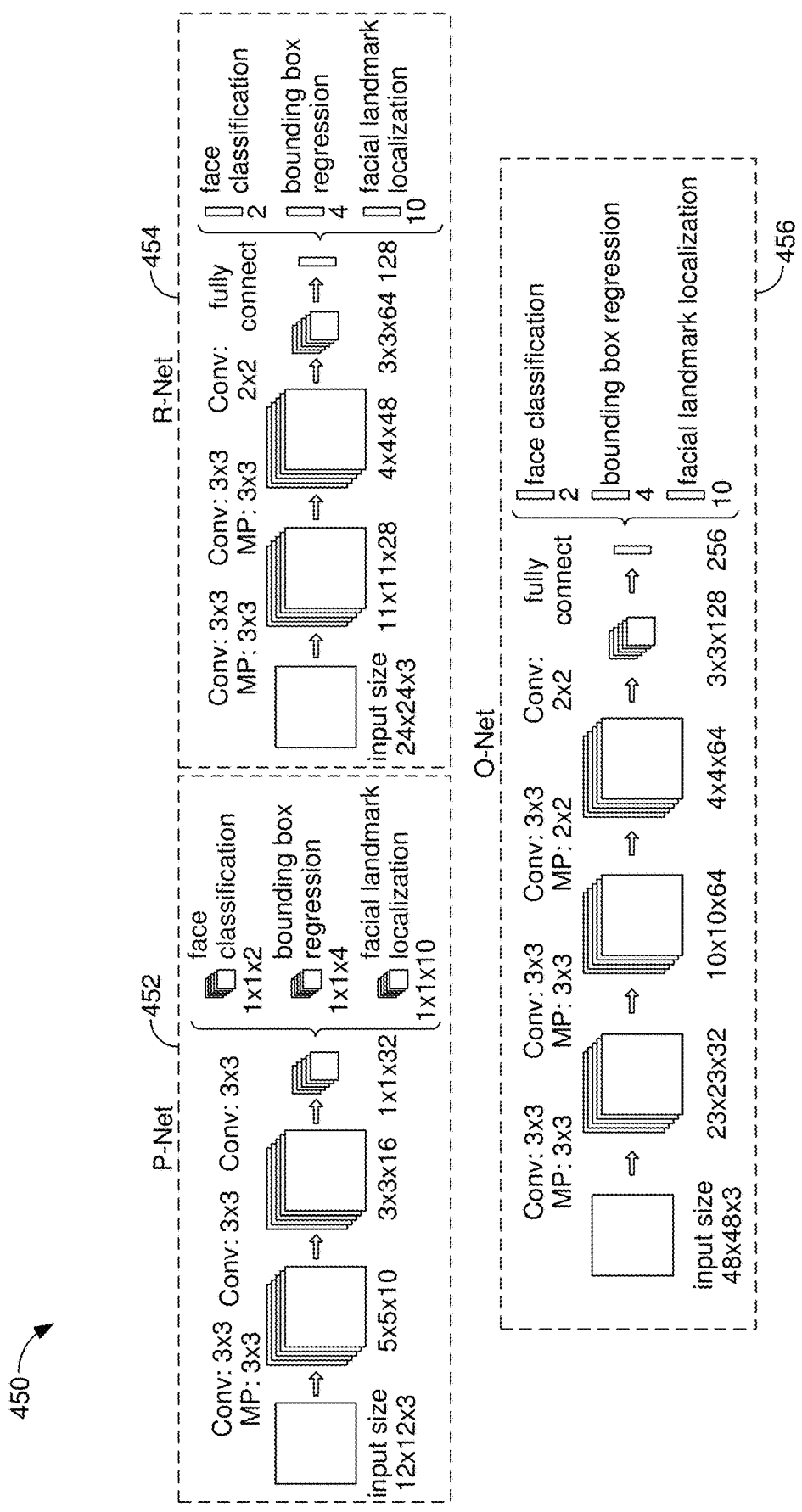
FIG. 4B depicts an example network architecture for facial detection, in accordance with various embodiments of the disclosure.

FIG. 4B depicts a network architecture for an embodiment of input face detector 210. Specifically, FIG. 4B depicts an example MTCNN architecture 450, which includes a P-Net 452, an R-Net 454, and an O-Net 456. Each network (also referred to as a stage) includes a series of max pooling (designated as "MP" in FIG. 4B) and convolutional (designated as "conv" in FIG. 4B) layers. In one embodiment, the step size in convolution is one, and the step size in pooling two.

In alternative embodiments, input face detector 210 may utilize other types of neural networks, machine learning models, or other techniques for facial detection. Examples of such techniques that may be used include, but are not limited to, histogram of oriented gradients (HOG), principle component analysis (PCA), eigenfaces (a set of eigenvectors used for human face recognition), or other CNNs.

In some instances, the input image includes only one face and, as such, input face detector 210 detects only one face. Where the input image includes more than one face, some embodiments of input face detector 210 detect multiple faces from one input image. In some embodiments, where multiple faces are detected, a user is presented with the detected faces, and a user selects a face for further processing by identity obfuscation manager 200. Although the disclosure herein focuses on one face within an image, it is contemplated that identity obfuscation manager 200 may synthesize multiple new faces for combining with an input image where input face detector 210 detects multiple faces in the input image.

Where input face detector 210 detects a face depicted in the input image, the face extracted from the input image may be referred to as a base facial image that is utilized for synthesis of the new facial image as described herein. In some instances, however, input face detector 210 may not detect a face in the input image, such as where the face is cropped out of the input image, is blurred, or is otherwise obscured by an object, such as a block box, in the input image. In some embodiments, if input face detector 210 is unable to detect a face, a message is displayed to the user requesting that a new image depicting a face be input. Additionally, the message may indicate that a new face will be generated for the input image to help protect the user's identity. Where a user does not upload an image with a detectable face (such as where the user initially inputs an image without a face or refuses to input a new image upon receiving a request), some embodiments of the disclosed technology select a base facial image for the input image as described further below with respect to base face selector 270.

New facial image synthesizer 220 is generally responsible for creating an image of a new face utilizing a set of images with faces that are similar to the base face, which may either be detected in the input image by input face detector 210 or selected by base face selector 270. As such, embodiments of new facial image synthesizer 220 identify similar facial images and combine the similar facial images to create a new facial image.

In exemplary embodiments, new facial image synthesizer 220 identifies similar facial images by extracting features in the base facial image and comparing the extracted features to features of reference facial images. New facial image synthesizer 220 utilizes a neural network, which may be a deep learning neural network, to extract facial features from the base facial image. An example embodiment of new facial image synthesizer 220 utilizes VGGFace2 model for extracting high dimensional feature vectors from the facial images. VGGFace2 makes use of deep convolutional neural networks, such as residential neural networks (e.g., ResNet-50) and its variants, for classification of facial images. In an exemplary embodiment, new face synthesizer utilizes SE-ResNet (which may also be referred to as SqueezeNet or SE-Net). Utilizing one or more deep neural networks, an embodiment of new facial image synthesizer 220 extracts 512 features from each base facial image, generating a 512 dimensional feature vector.

The features extracted from the base facial image, which may be in the form a high dimensional feature vector, are compared to features of references facial images. Reference facial images are images depicting an individual's face. The reference facial images may be stored in data store 250. The features of each reference facial image may be extracted in the same manner as the base facial image, such as by utilizing a deep neural network to extract 512 features. In some embodiments, the features of the reference facial images are extracted prior to receipt of the input image such that the extracted features may be stored in association with the corresponding reference facial image. Alternatively, new facial image synthesizer 220 may extract the facial features of the reference facial images during runtime, after receipt of the input image.

In comparing facial features of the base facial image to facial features of the reference facial images, new facial image synthesizer 220 determines a similarity metric for each pair comprising the base facial image and a reference facial image. The similarity metric may be a distance-based metric, such as Euclidean distance. In an exemplary embodiment, for instance, new facial image synthesizer 220 determines the Euclidean distance between a feature vector for the base facial image and a feature vector for a reference facial image. Euclidean distance between two vectors may be output as:

$$\|\bar{a}-\bar{b}\|_2 \text{ where } \|\bar{x}\| = \sqrt{x_1^2 + x_2^2 + x_3^2 + x_4^2 + \ldots}$$

where $x_1$, $x_2$, $x_3$, $x_4$ are vector elements.

In alternative embodiments, other similarity metrics may be utilized. Such metrics may include but are not limited Manhattan distance, cosine similarity, Pearson's correlation, Spearman's correlation, Kendall's Tau, and Jaccard index.

Figure 5:
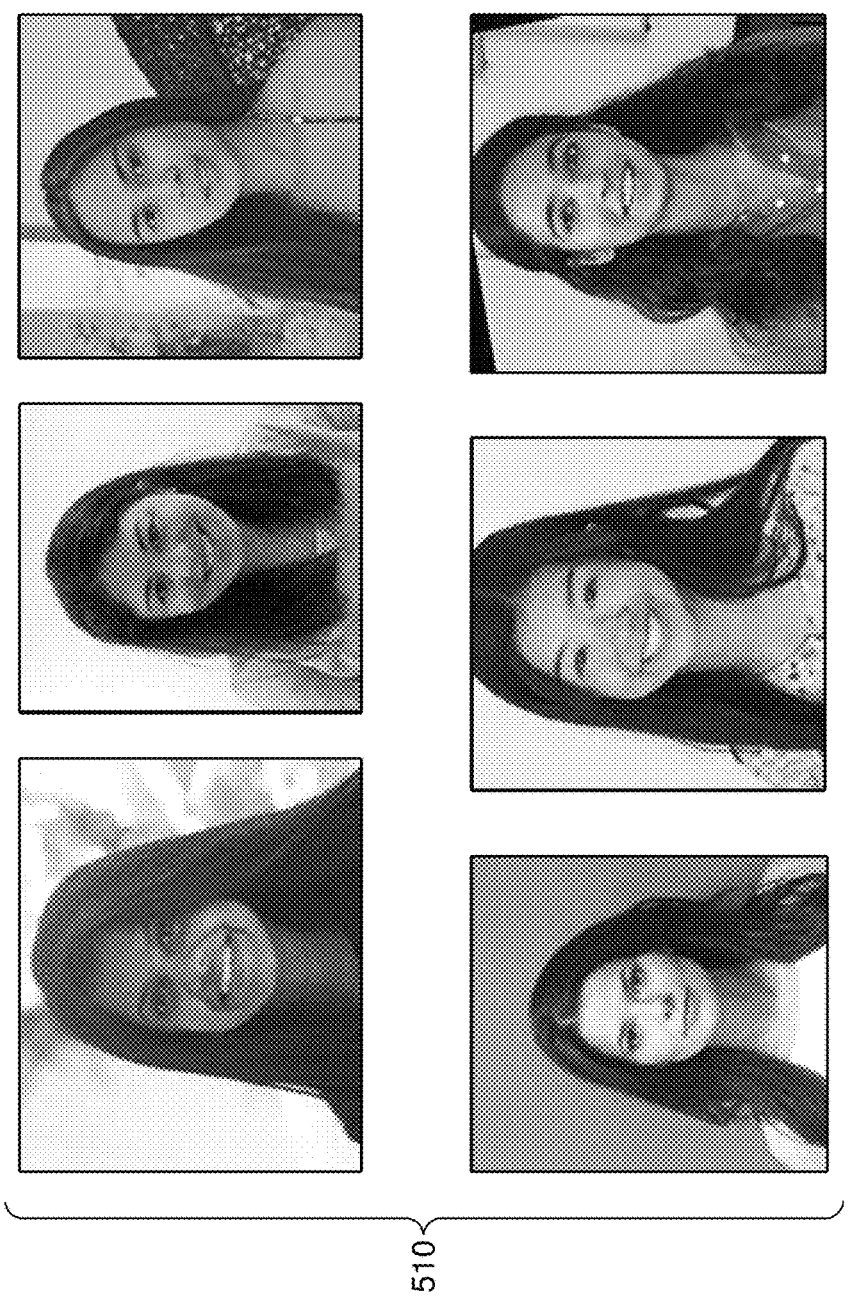
FIG. 5 depicts similar facial images selected for an example input image, in accordance with various embodiments of the disclosure.
Figure 5:

Based on the similarity metrics computed for each pair, a set of similar facial images are selected from the reference facial images, where the selected facial images are the top n reference facial images that have the most similarity with the base facial image. For embodiments utilizing Euclidean distance, the reference facial images with the smallest distance are selected as most similar to the base facial images. In some embodiments, the number of images selected for the set of similar images (n) may be a value within a range of two and ten. For example, the set of similar facial images may consist of six reference facial images that have been determined to be most similar to the base facial image. FIG. 5 depicts an example set of similar facial images 510 that may be identified for the example base facial image 512.

After selection of the similar facial images, new facial image synthesizer 220 creates a new face by combining the similar facial images. However, it may be appreciated that the similar facial images may be of different sizes, depict faces occupying different regions of the frame, depict faces with different relative positioning of facial features, and/or depict faces arranged in different poses. Thus, in exemplary embodiments, combining the similar facial images includes aligning the similar facial images. New facial image synthesizer 220 performs alignment by transforming the similar facial images into an output image space. The output image space is a fixed space where the combination of the similar facial images are formed. As such, new facial image synthesizer 220 initializes an image matrix of a fixed size with zero values assigned to all pixels, and the selected similar facial images are aligned and warped to the output space. An example output image space is a 600×600 image matrix.

Figure 6A:
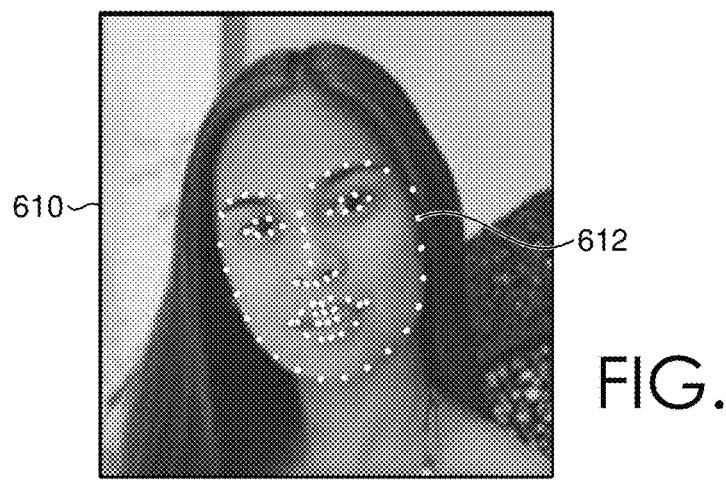
FIG. 6A depicts an example mapping of facial landmarks detected on a similar facial image, in accordance with various embodiments of the disclosure.

This process includes detecting facial landmarks in the similar facial images, which are used to rescale the similar facial images to the output space, perform triangulation, and warp the similar facial images to the output space. Facial landmarks localize particular regions of a face within an image. In exemplary embodiments, new facial image synthesizer 220 detects 68 facial landmarks for each similar facial image. FIG. 6A depicts an example similar facial image 610 with facial landmarks, such as facial landmark 612, identified.

In exemplary embodiments, facial landmarks are detected using Histogram of Oriented Gradients (HOG) and a support vector machine (SVM). The HOG of an image is found by converting the image into a black and white image and determining the intensity at every pixel relative to the surrounding pixels. Each pixel is assigned an arrow in the direction in which the image is getting darker. These arrows associated with each pixel in the image are the oriented gradients of the image, which show the overall flow of light in the image. In some embodiments, the image is divided into subregions, such as regions of 16×16 pixels, and each subregion is assigned a single arrow representing the direction that has the maximum count of arrows in that direction within in that particular subregion. As such, the arrows for the subregions may be the extracted HOG features. The HOG features for a facial image are fed into a support vector machine, such as a linear support vector machine, which generates the facial landmarks for the similar facial image. In some embodiments, the facial landmark coordinates for reference facial images are stored for future use.

Figure 6B:
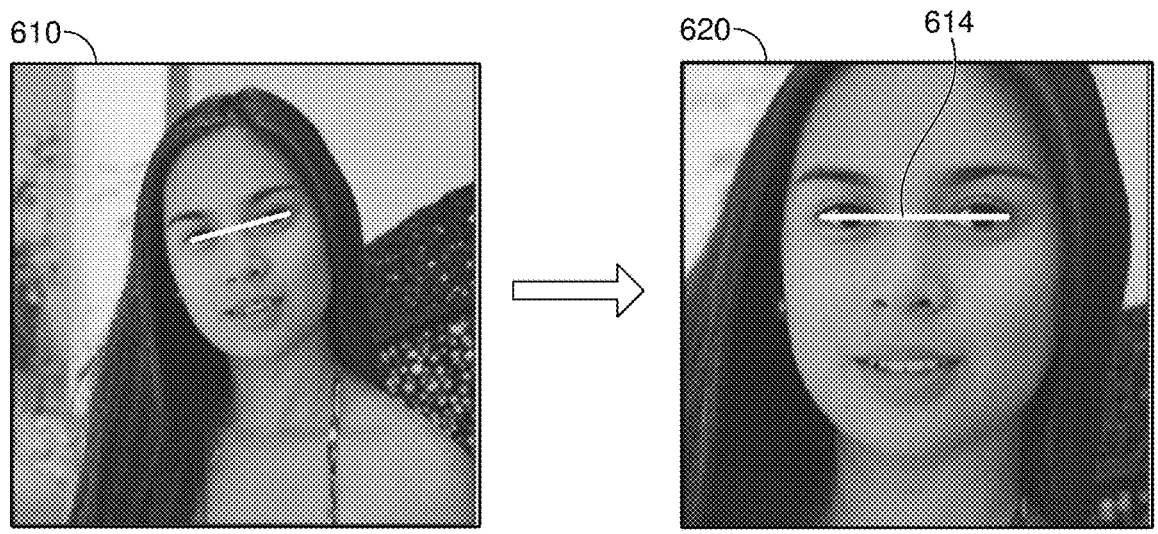
FIG. 6B depicts an example alignment of facial landmarks in the similar facial image of FIG. 6A to an output image space, in accordance with various embodiments of the disclosure.

The facial landmarks for the images within the set of similar facial images are utilized to align the images within the output image space. Initially, each similar face image may be rescaled to the size of the output image space. For example, each similar face image may be rescaled to a size of 600×600 where the output image space is 600×600. For each facial landmark, the coordinates for the particular facial landmark from all similar facial images are averaged to determine the coordinate for that particular facial landmark in the output image space. The coordinates of the facial landmarks in each similar facial image are warped to the fixed coordinates in the output image space. FIG. 6B depicts similar facial image 610 being transformed into similar facial image 620 that is warped into output image space. Line 614 between coordinates of the corners of the eyes is depicted to show the re-alignment from similar facial image 610 to the warped similar facial image 620.

Figure 6C:
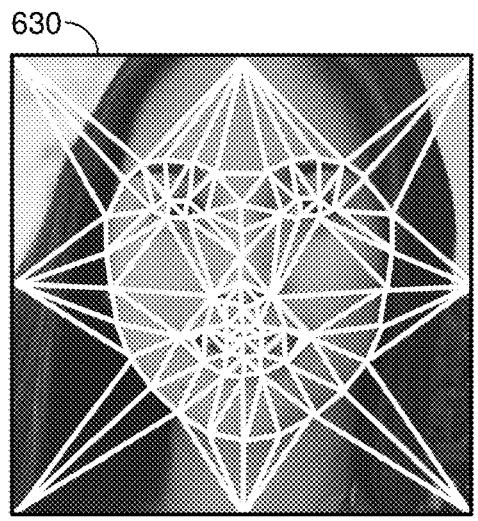
FIG. 6C depicts an example triangulation of the similar facial image of FIG. 6A, in accordance with various embodiments of the disclosure.
Figure 7:
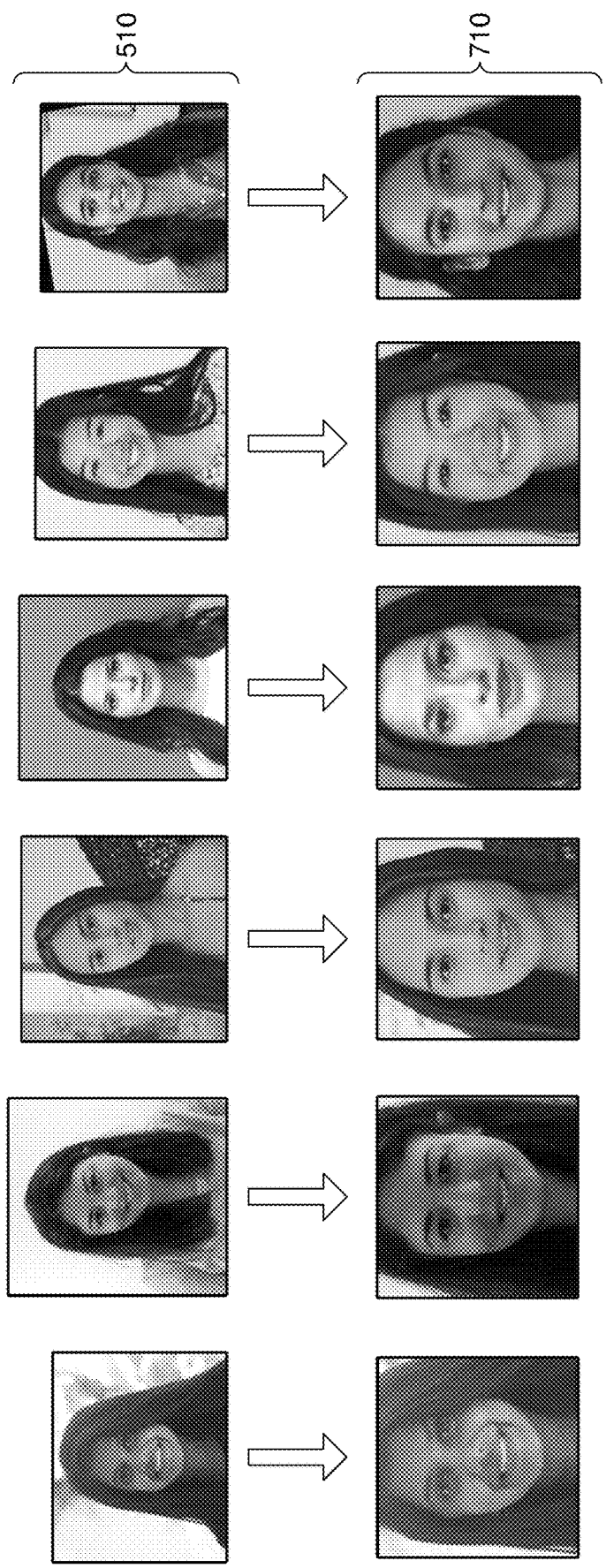
FIG. 7 depicts an example set of similar facial images that have been aligned to an output image space, in accordance with various embodiments of the disclosure.

To ensure precise alignment, some embodiments of new facial synthesizer 220 further perform triangulation by dividing each similar facial image and the output image space (where the landmark coordinates are the averaged coordinates) into triangular regions. The triangular regions are determined from the detected facial landmarks. In exemplary embodiments, at least one point on each triangular region is the coordinate of a facial landmark. Further, in exemplary embodiments, Delaunay Triangulation is performed, where a convex hull (a boundary that has no concavities) is created and the triangulation that is chosen is the one in which every circumcircle of a triangle is an empty circle. The triangular regions in each similar facial image are warped to the triangular regions in the output image space using affine transformations. Triangulation helps ensure that similar facial regions in the similar facial images fall in the same region of the output space so that they can be combined as described below. FIG. 6C depicts warped similar image 630 that is warped to the output image space using triangulation. FIG. 7 shows the results of this landmark registration and warping process. Specifically, FIG. 7 depicts the example set of similar facial images 510 of FIG. 5 and a set of warped similar facial images 710 that are all warped to the same output image space.

Figure 8:
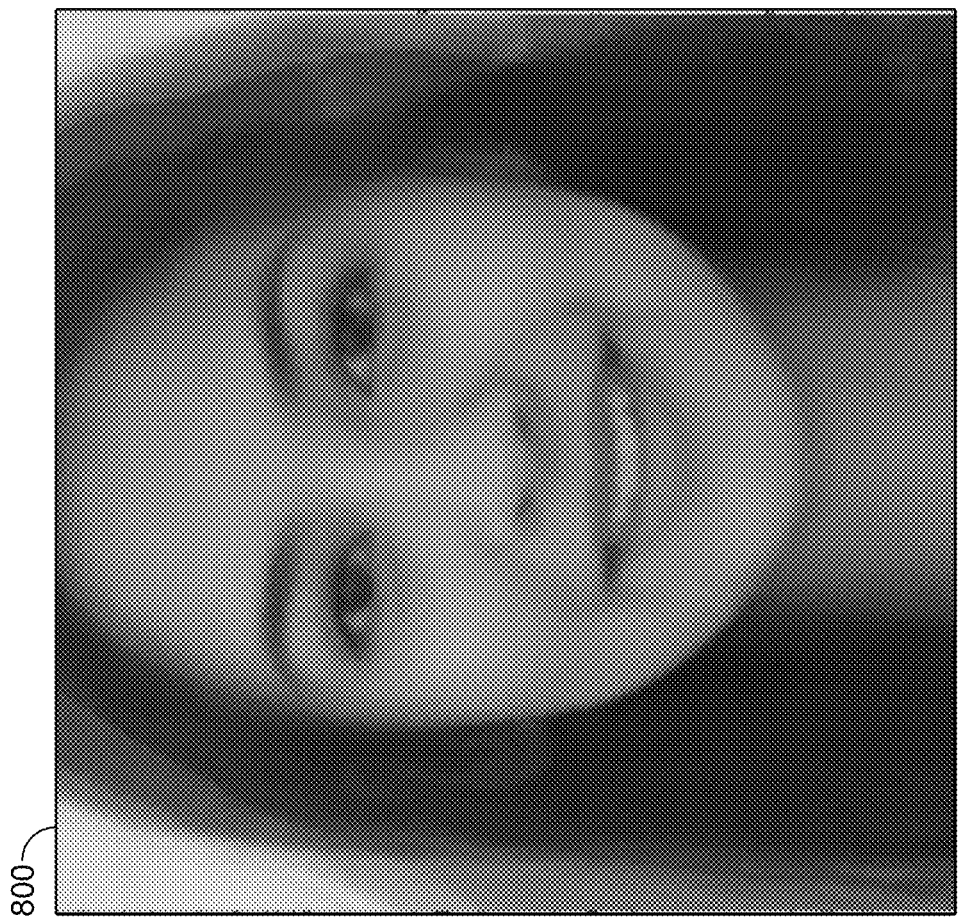
FIG. 8 depicts an example new facial image synthesized from the set of similar facial images of FIG. 7, in accordance with various embodiments of the disclosure.

After the similar facial images are aligned and warped to an output image space, the similar facial images are combined by averaging pixel intensities of each similar facial image at each pixel within the output image space. In some embodiments, an average pixel intensity for the output image space is computed by summing the corresponding pixels values of all the warped similar facial images and dividing the sum by the number of similar facial images within the set. In some embodiments, a weighted average may be computed. This result of averaging similar facial images is a newly synthesized facial image. Because this new facial image depicts a face that is created from a combination imaged faces, it does not depict an actual person's face. In this way, the new facial image created by new facial image synthesizer 220 does not expose another person's identity. FIG. 8 depicts an example new facial image 800 that is from the example set of similar facial images 510 of FIG. 5.

After a new facial image is created from similar facial images, it is combined with the base facial image. As such, new user facial image generator 230 is generally responsible for combining the base facial image and the new facial image. The resulting combination may be referred to herein as a new user facial image; however, it is should be understood that, in some implementations, this combination is based on a base facial image selected from a database rather than a user input facial image. Combining the new facial image with the base facial image helps to preserve some aesthetics, such as complexion, structure, and size, of the base facial image.

New user facial generator 230 combines the new facial image and base facial image by aligning and blending the images. Alignment of the base facial image is performed in a manner described for aligning the similar facial images. Specifically, facial landmarks are detected on the base facial image and aligned with the coordinates of the output image space. In exemplary aspects, the coordinates of facial landmarks in the output image space are determined here by averaging landmark coordinates from the base facial image and corresponding landmark coordinates of the new facial image. Triangulation is performed on the base facial image, and the base facial image and the new facial image (for which triangulation was previously applied) are warped to the output image space based on the triangular regions.

After the new facial image and the base facial image are warped to the output image space, alpha blending is performed. With alpha blending, the new facial image and the base facial image overlay one another and the translucency of color on the top layer is adjusted to create a blended color between the top layer and bottom layer. The top layer may either be the new facial image or the base facial image where the bottom layer will be the other one. In exemplary embodiments, new user facial image generator 230 performs alpha blending by computing the following:

$$M(x_m, y_m) = (1-\alpha)I(x_i, y_i) + \alpha J(x_j, y_j)$$

where I represents the new facial image, J represents the base facial image, M represents the combination of I and J.

Figure 9:
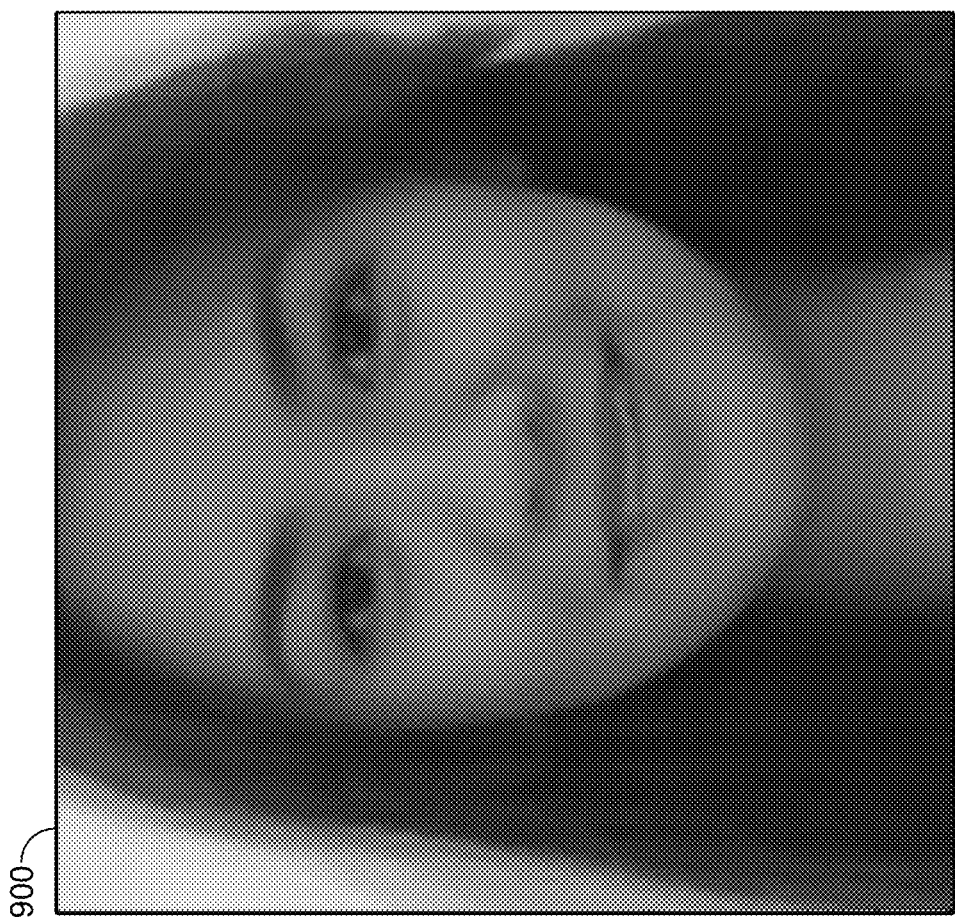
FIG. 9 depicts an example combination of the new facial image of FIG. 8 and a base facial image extracted from an input image, in accordance with various embodiments of the disclosure.

The amount of blending, as defined by the alpha value, is at least initially set according to a predetermined value. In some embodiments, the alpha value is set at 0.5, which results in a new user facial image that is equal parts new facial image and base facial image. FIG. 9 depicts an example new user facial image 900 that is created by combining the new facial image 800 of FIG. 8 and base facial image 512 of FIG. 5. Some embodiments of new user facial image generator 230 utilizes an initial alpha value for blending, and the alpha value may be adjusted by the user. Allowing the user to adjust the alpha value gives the user the freedom to determine how similar the new user facial image is to the base facial image.

Input image updater 240 is generally responsible for updating the input image with the new user facial image generated by new user facial image generator 230. As the input image may often have other aspects of the individual, such as hair and body, that are not part of the generated new user facial image, input image updater 240 operates to help create a seamless blend between the new user facial image and the input image.

In aspects in which the base facial image is extracted from the input image, input image updater 240 aligns the new user facial image with the face detected in the input image because the face from the input image indicates a natural-appearing alignment of a face with the rest of the input image. This process may be similar to the alignment and morphing process described with respect to the similar facial images. Facial landmarks are extracted and used to form a convex hull over the detected facial landmarks, and triangulation is performed inside the convex hull, using the facial landmark coordinates. In some embodiments, the triangular regions have points corresponding to angles or midpoints along the convex hull, rather than along a facial image boundary box as described in some embodiments of new facial image synthesizer 220. The triangular regions of the convex hull of the new user facial image are warped to the face within the input image.

After aligning the new user facial image within the input image, embodiments of input image updater 240 blend the new user facial image with the background of the input image. In exemplary embodiments, input image updater 240 uses Poisson blending, which utilizes image gradients such that the gradient of the facial region within the resulting updated input image is the same or almost the same as the gradient of the facial region in the input image. Additionally, the intensity of intensity of the new user facial image may be adjusted so that it is the same as the intensity of the original facial region detected within the input image.

Figure 10A:
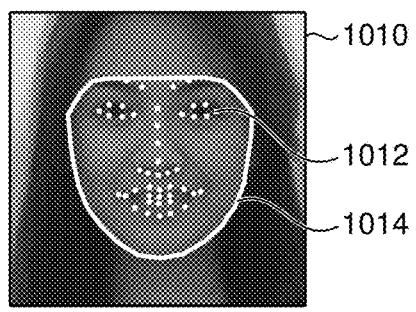
FIGS. 10A-10E depict stage of an example process for updating an input image with the new user facial image of FIG. 9, in accordance with various embodiments of the disclosure.
Figure 10B:
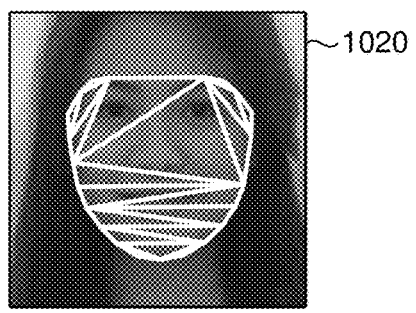
Figure 10C:
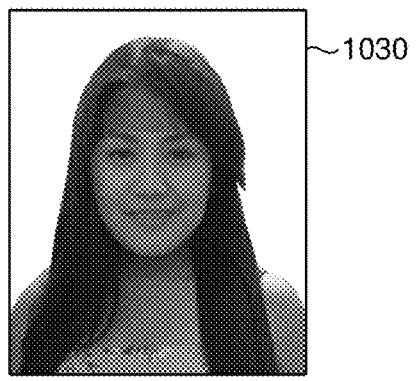
Figure 10D:
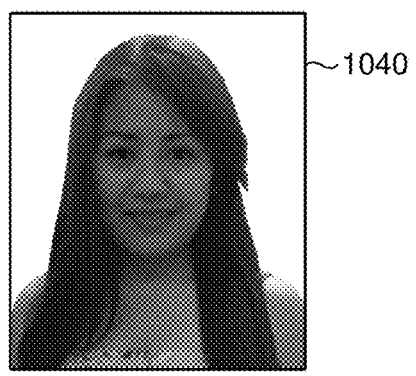
Figure 10E:

FIGS. 10A-10E depict a series of images as user image is updated with a new user facial image. FIG. 10A depicts a new user facial image 1010 with detected facial landmarks 1012 in a convex hull 1014. FIG. 10B depicts a triangulated new user facial image 1020 that is divided into triangles based on the facial landmarks 1012 and convex hull 1014. FIG. 10C depicts a portion of an aligned updated input image 1030 in which the new user facial image 1010 is aligned with the face region of the user input image. FIG. 10D depicts a portion of blended updated input image 1040 in which the new user facial image and the rest of the updated input image are blended together to create a seamless transition between the original aspects of the input image and the new user facial image that has been created. FIG. 10E depicts the final updated input image 1050 in its entirety.

As previously stated, some embodiments of the disclosed technology may be performed on input images that do not depict a face, such as where the face is cropped out of the image, the face has been blurred, or the face has been otherwise obstructed, such as by covering the face with a box. Where input face detector 210 does not detect a face in the input image, a base facial image may be selected from a database to synthesize the new facial image and update the input image. Additionally, missing background that is cropped out, blurred, or otherwise obstructed that would be visible if the input image included a face may be added. As such, some embodiments of identity obfuscation manager 200 include background reconstruction component 260 and base face selector 270.

Background reconstruction component 260 is generally responsible for adding missing background on which a new face can be added where the input image does not originally have a face. In some embodiments, background reconstruction component 260 reconstructs the background automatically upon input face detector 210 determining that the input image does not include a face. In other embodiments, background reconstruction component 260 reconstructs the background of the input image after a message is provided to the user indicating that a face was not detected in the input image and an indication is received that the user would like to add a synthesized face to the input image.

To reconstruct the background, background reconstruction component 260 increases the height of the input image by adding empty rows of pixels in the top region of the input image. The number of empty rows to add may be determined heuristically. In one embodiment, the number of empty rows added is 30% of the height of the input image. Background reconstruction component 260 then reconstructs the background of the input image for the empty rows that were added. In exemplary embodiments, background reconstruction component 260 utilizes sampling techniques to reconstruct the background to be continuous with the background in the input image. In one embodiment, background reconstruction component 260 utilizes the Content-Aware Fill tool from Adobe® Photoshop®. However, it is contemplated that other existing background generation algorithm can be utilized, including but not limited to temporal median filtering, Monte-Carlo based algorithms, and other nonparametric background generation techniques like the effect components description (ECD) model.

Figure 11:
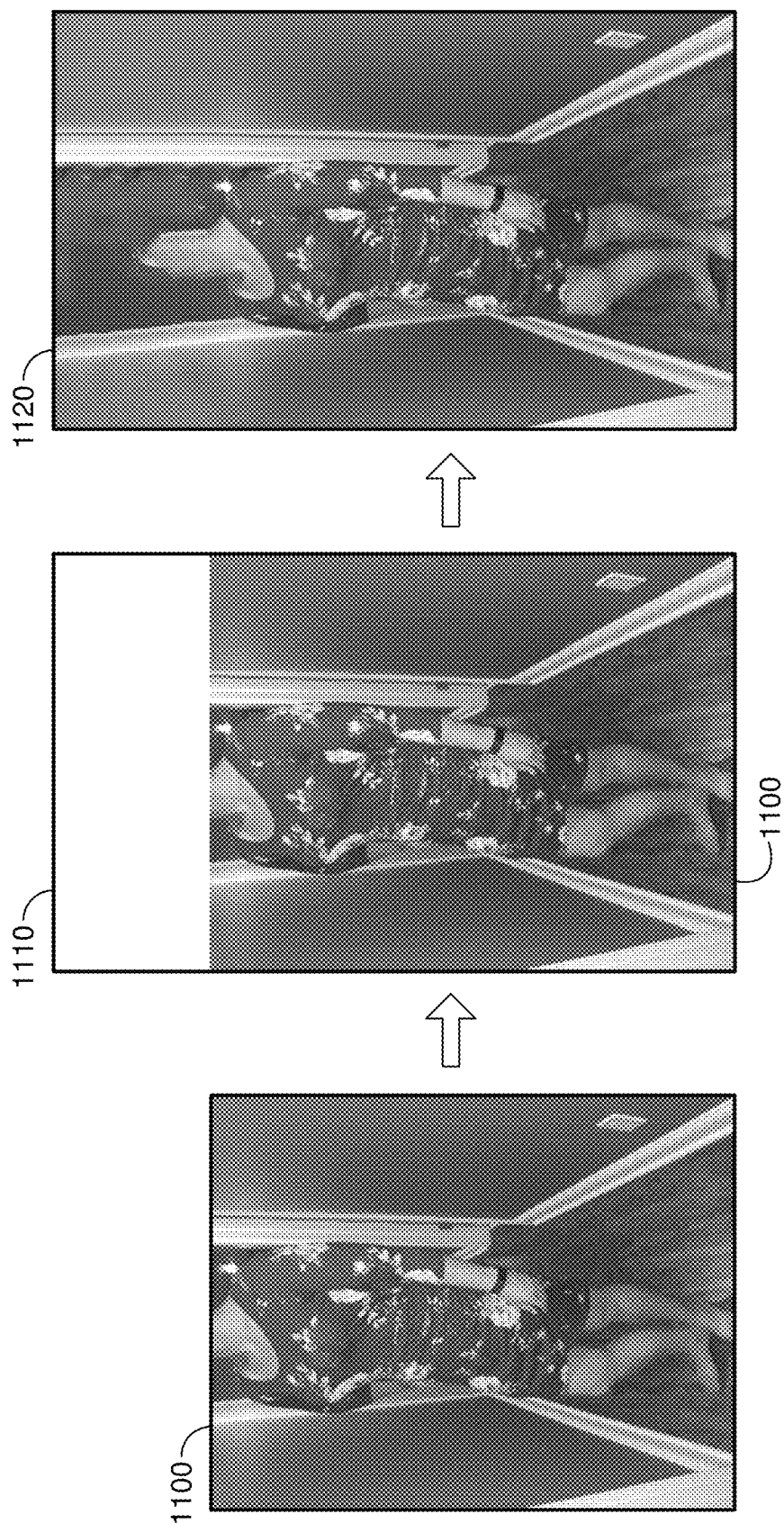
FIG. 11 depicts an example process for background reconstruction, in accordance with various embodiments of the disclosure.

Turning briefly to FIG. 11, an example background reconstruction process is illustrated. FIG. 11 depicts an input image 1100 in which a person's body is visible but the input image 1100 is cropped at the person's neck such that no face is depicted. Empty rows 1110 are added above the top side of the input image 1100, and then background is filled in the empty rows to create reconstructed input image 1120.

Base face selector 270 is generally responsible for selecting a base facial image for an input image where the input image does not include a face. Base face selector 270 selects the base facial image by estimating pose keypoints on the body of the individual in the input image and utilizing the pose keypoints to identify a matching base facial image from a database of reference base facial images.

Figure 13:
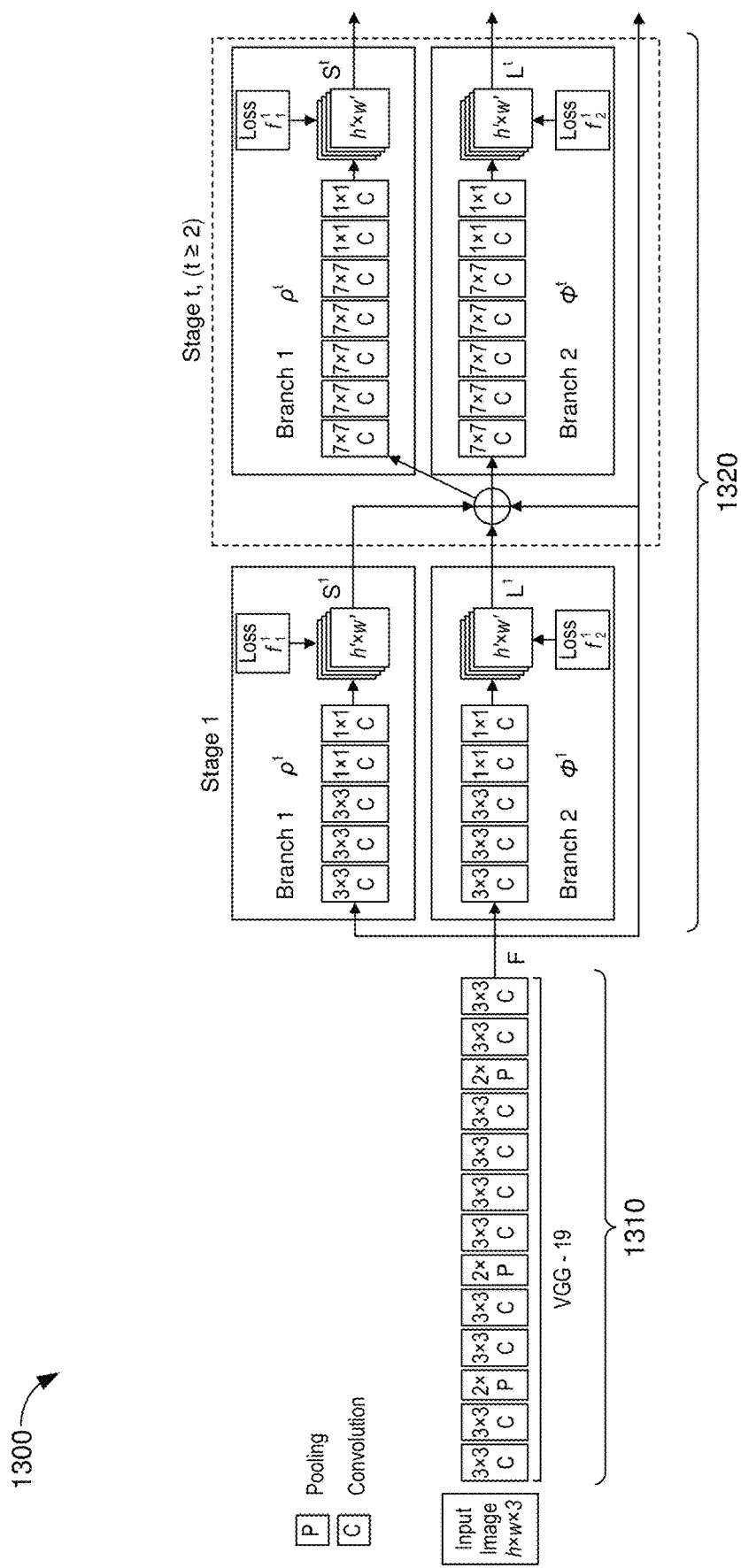
FIG. 13 depicts an example network architecture for pose keypoints estimation, in accordance with various embodiments of the disclosure.

Embodiments of base face selector 270 estimates pose parameters utilizing a trained deep learning based model. In exemplary embodiments, base face selector 270 estimates 18 pose keypoints utilizing the COCO human body pose estimation model. An example architecture of the COCO model is depicted in FIG. 13. COCO model 1300 includes a series of neural networks. Specifically, COCO model 1300 includes the first ten layers of VGGNet 1310, a deep convolutional neural network, and a two-branch multi-stage CNN 1320. The input image is input into the VGGNet layers 1310, which extract features from the input image. The extracted features are fed into the two-branch multi-stage CNN 1320, in which the first branch extracts the confidence maps for each key point in the input image and the second branch extracts the affinity or association between two key points. From this, COCO model 1300 outputs the 2D locations of key points on the body of a person in the input image. COCO model 1300 may further identify non-body key points, such as image background.

Figure 12:
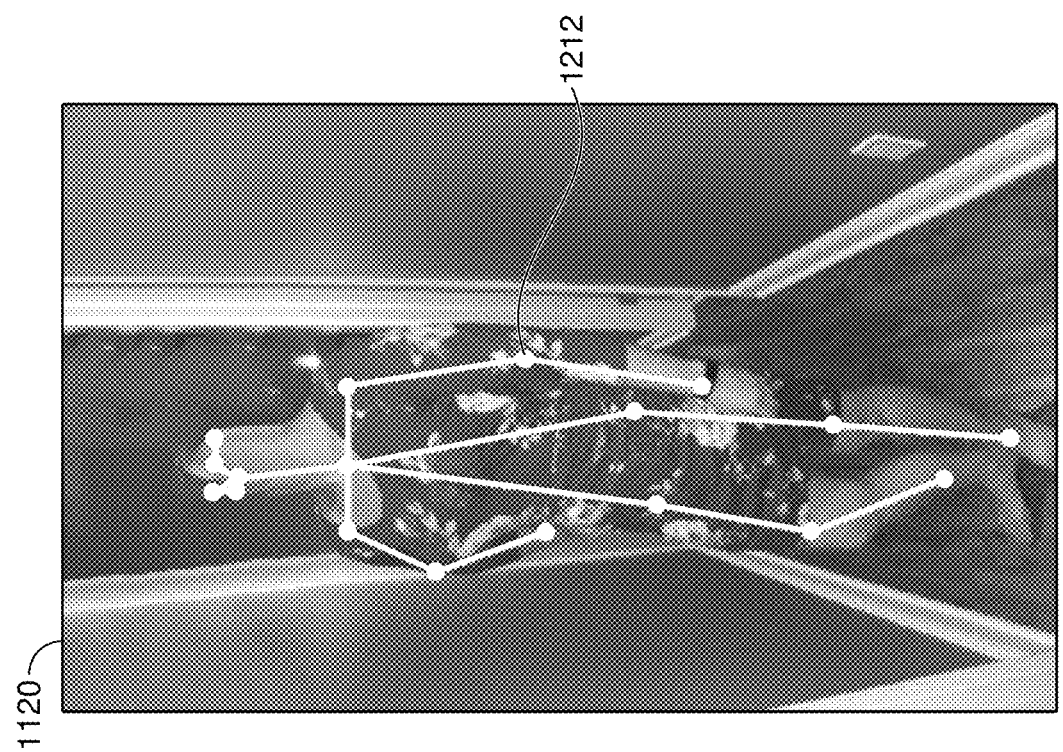
FIG. 12 depicts an example pose keypoints estimation on an input image, in accordance with various embodiments of the disclosure.

In exemplary embodiments, base face selector 270 determines up to 18 pose keypoints for each input image. Each of these pose keypoints are indexed from 0 to 18. In exemplary embodiments, the following pose keypoints are identified in the input image: Nose—0, Neck—1, Right Shoulder—2, Right Elbow—3, Right Wrist—4, Left Shoulder—5, Left Elbow—6, Left Wrist—7, Right Hip—8, Right Knee—9, Right Ankle—10, Left Hip—11, Left Knee—12, Left Ankle—13, Right Eye—14, Left Eye—15, Right Ear—16, Left Ear—17, and Background—18. FIG. 12 depicts an example estimation of pose keypoints 1212 generated for the reconstructed input image 1120 of FIG. 11. Coordinates for some key points, such as key points 0 and 14-17 on the head, may not always be estimated as the input image is headless or at least faceless.

Base face selector 270 utilizes the coordinates for the pose keypoints of the input image to select a base facial image for the input image. Specifically, the pose keypoints coordinates are utilized to determine a face direction. The face direction is the direction that a face in the input image would likely be facing. In exemplary embodiments, a neural network is trained to determine the most likely face direction category utilizing the pose keypoint coordinates for the input image. In some embodiments, the direction categories are front, left, right, and back. In other embodiments, the input image may be classified into a direction out of additional direction categories, including but not limited to front-left, front-right, back-left, and back-right. In some embodiments, the pose keypoint coordinates are rescaled so that they are confined them to a pre-determined range before being fed through the neural network to determine the most likely face direction.

Base face selector 270 selects a base facial image from a database of reference facial images, where the selected base facial image has the same direction as what is determined for the input image. The face directions of the facial images in the reference database may be determined automatically by estimating pose keypoints and running the key points through a trained neural network similar to determining the direction of the input image. In other embodiments, the facial images of the reference database are manually labeled with face directions. The base facial image may be selected from the same database of facial images that are utilized for selecting similar facial images, or the base facial image may be selected from a separate database of facial images.

Some embodiments of base face selector 270 may also estimate other attributes of the person depicted in the input image, such as skin color and/or gender, to select the base facial image. In some embodiments, gender may be determined based on user input. For instance, a user may be prompted to identify a gender that the person in the image identifies as, and the user may either select a gender or decline to provide one.

In other embodiments, base face selector 270 automatically determines a likely gender of the person within the input image using a trained neural network. In one implementation, base face selector 270 utilizes a CNN model with COCO pose-estimation weights initialized for the initial layers of feature extraction to predict the gender of the person in the input image. When a gender is predicted or identified by a user, the base facial image may then be selected based on the face direction as well as the gender such that the base facial image selected has a gender matching the input image. Where a user declines to provide a gender, the base facial image may be determined without consideration of gender.

Further, some embodiments of base face selector 270 estimate a skin color of the person in the input image such that selected base facial may have a similar skin color as the body depicted in the input image, which will enable a more seamless transition when the input image is updated with the new user facial image. As such, some embodiments of base face selector 270 convert the input image to a predefined skin color range in the YCrCb (Luminance-Chrominance) color domain and define the skin color as the YCrCb value that is most predominantly present in the input image relative to other colors in the domain. In an example embodiment, the skin color range in the YCrCb (Luminance-Chrominance) color domain is defined as (0, 133, 77) to (255, 173, 127). The skin color determined for the input image is utilized to select the base facial image such that the skin color of the base facial image is the same or similar to the skin color of the input image. Skin color may be utilized with face direction and, in some embodiments, gender to select the base facial image.

Figure 14:
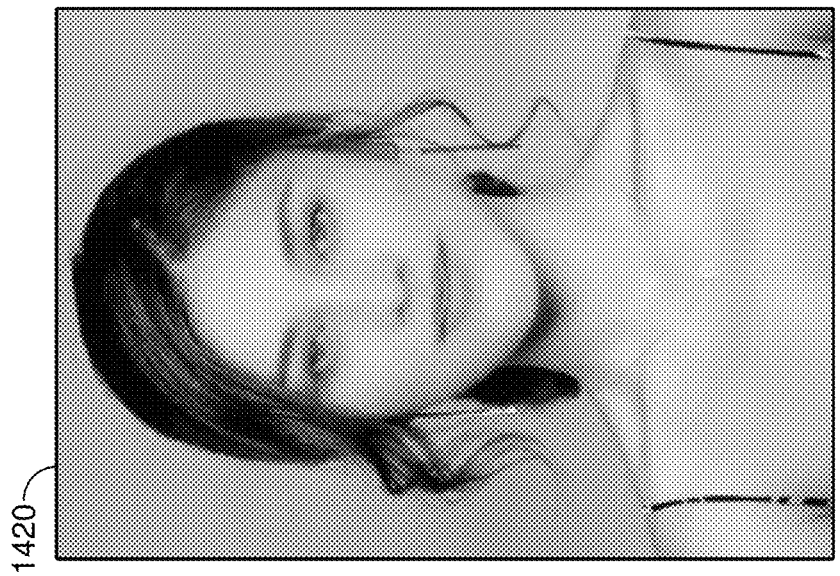
FIG. 14 depicts an example new base facial image and a new facial image, in accordance with various embodiments of the disclosure.
Figure 14:
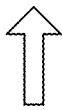
Figure 14:
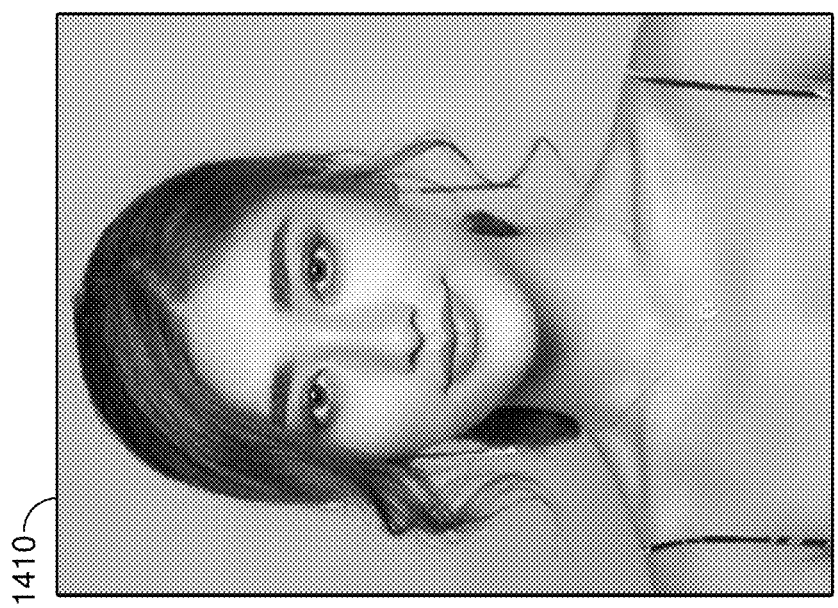

After base face selector 270 selects a base facial image for an input image, the selected base facial image is utilized to synthesize a new facial image based on similar facial images as previously described with respect to new facial image synthesizer 220. Additionally, a new user facial image is generated by combining the new facial image with the selected base facial image as described with respect to new user facial image generator 230. FIG. 14 depicts an example base facial image 1410 selected by an embodiment of base face selector 270, and an example new user facial image 1420 created by combining the base facial image 1410 with a face synthesized by averaging a set of facial images determined to be similar to the base facial image 1410.

The new user facial image generated for a faceless image is added to the input image by input image updater 240. This process includes aligning the new user facial image within the input image and blending the two images together. Because the input image is faceless in this context, input image updater 240 aligns the new user facial image within the input image in a different manner than that previously described for input images having faces. Where the input image is faceless and the new user facial image is created from a selected base facial image, input image updater 240 separates the face from the background in the new user facial image utilizing a foreground and background separation technique.

Figure 15B:
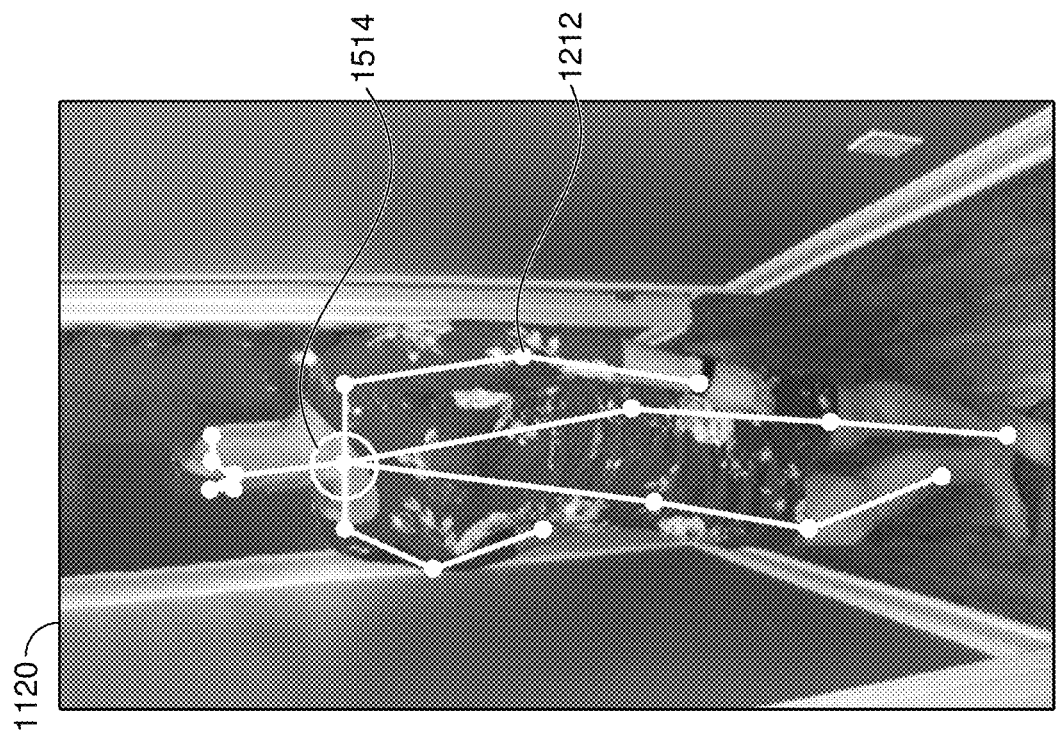
FIGS. 15A and 15B depict example pose estimations on the new synthesized face of FIG. 14 and the reconstructed input image of FIG. 12, in accordance with various embodiments of the disclosure.
Figure 15A:
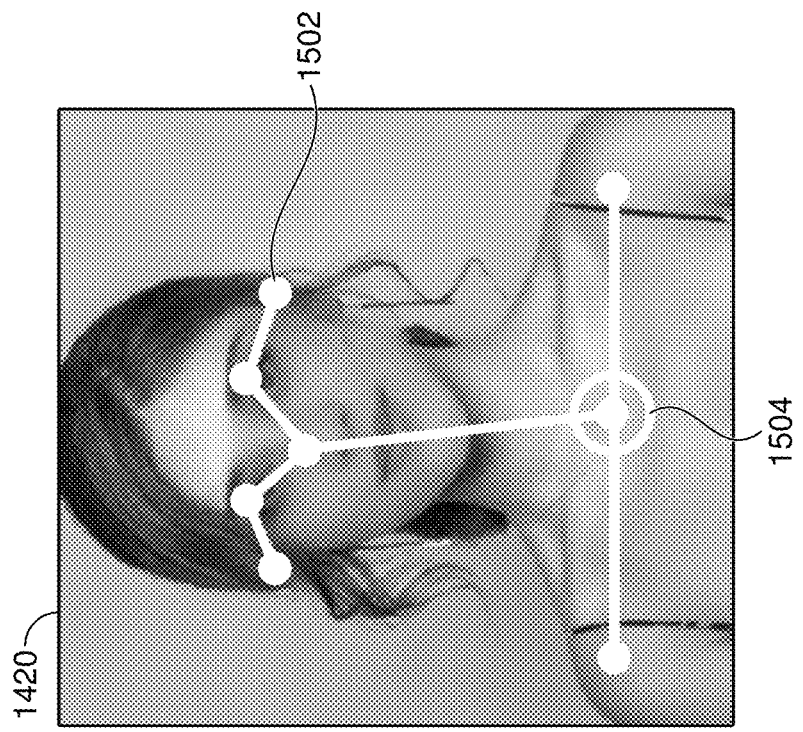

Additionally, pose keypoint coordinates are determined for the new user facial image utilizing the same process described for selecting the base facial image. Coordinates for pose keypoint for the neck in the new user facial image and the input image are utilized to align the two images. FIG. 15A depicts pose keypoints 1502 estimated for the new user facial image 1420, and FIG. 15B depicts pose keypoints 1212 for the reconstructed input image 1120 from FIG. 11, which were previously determined to select the base facial image. Pose keypoint for the neck is highlighted with circle 1504 in FIG. 15A and circle 1514 in FIG. 15B. The pose keypoint for the neck in the new user facial image is warped to the pose keypoint for the neck in the input image.

Figure 16:
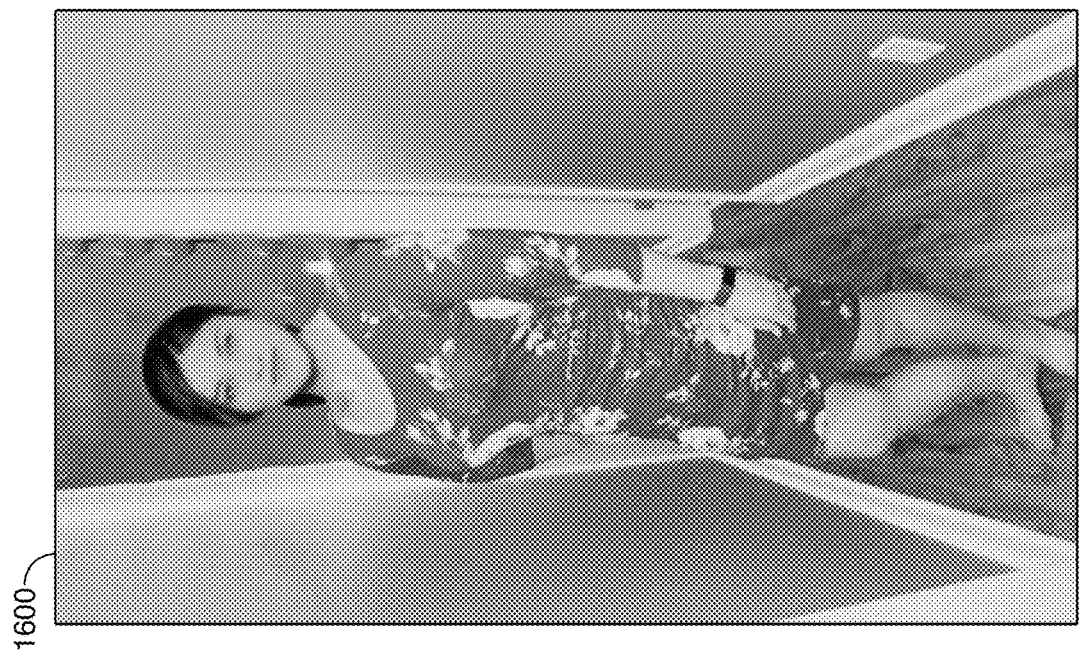
FIG. 16 depicts an output of an embodiment of identity obfuscation manager based on an input image depicted in FIG. 11, in accordance with various embodiments of the disclosure.

Once aligned, the new user facial image and the input image are blended together. In exemplary embodiments, this blending process is Poisson blending as previously described. FIG. 16 depicts an example updated user image 1600 that is created from reconstructed input image 1120 of FIG. 11 and new user facial image 1420 of FIG. 14.

Some embodiments of identity obfuscation manager 200 include a similarity score determiner 280 that is generally responsible for determining a similarity score for an updated input image. A similarity score is a metric measuring the degree of similarity or the degree of difference between the updated input image and the original input image. In some embodiments, the similarity score is utilized to ensure that some aesthetics of the input image are retained in the updated user input image. In these cases, the similarity score determined for an updated input image is compared to a predetermined minimum threshold similarity score, and if the similarity score for the updated input image does not meet the minimum threshold, a user is provided a notification indicating that identity obfuscation will change the aesthetics of the user's input image. Additionally or alternatively, the similarity score may be utilized to ensure that the updated input image is not too similar to the input image so that the identity is not properly protected. As such, in these instances, the similarity score determined for an updated input image is compared to a predetermined maximum threshold similarity score, and if the similarity score for the updated input image does not meet the maximum threshold, a user is provided a notification indicating that facial identity could not be protected. Where the updated input image does not meet the maximum threshold score, the updated input image may either be presented with the notification or may not be presented at all. In some embodiment, the determined similarity score is compared to both a maximum score and a minimum score to determine whether the updated input image both sufficiently obfuscates the individual's identity and preserves the aesthetics of the original input image. Further, in some embodiments, the similarity score is computed and provided as feedback to other components of identity obfuscation manager 200 to help improve the functioning of identity obfuscation manager 200.

Exemplary embodiments of similarity score determiner 280 determines the similarity score by computing a structural similarity (SSIM) index value. SSIM index is a method in image processing used for predicting the perceived quality of an image. The SSIM index value is calculated on various windows of an image. The measure between two windows x and y of common size (N×N) is determined by the following:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

Where: $\mu_x$ is the average of x; $\mu_y$ is the average of y; $\sigma_x^2$ is the variance of x; $\sigma_y^2$ is the variance of y; $\sigma_{xy}$ is the covariance of x and y; $c_1=(k_1L)^2$ and $c_2=(k_2L)^2$; L is the dynamic range of pixel-values (typically, $2^{\#bits/pixel}-1$); and $k_1=0.01$ and $k_2=0.03$ by default. In accordance with the above, SSIM index satisfies the condition of symmetry, where:

$$SSIM(x,y)=SSIM(y,x)$$

The value of the SSIM index will be within a range from 0 to 1 and indicates how similar two images are. For example, if the SSIM index computed for an input image and the updated input image is 0.56, the two images are 56% similar and 44% different from each other. In some embodiments, the maximum threshold score is 0.75, and the minimum threshold score is 0.25.

Data store 250 is used to store computer instructions (e.g., software program instructions, routines, or services), data, and/or models used in embodiments described herein. In some implementations, data store 250 stores information or data received or generated via the various components of identity obfuscation manager 200 and provides the various components with access to that information or data, as needed. Although depicted as a single component, data store 250 may be embodied as one or more data stores. Further, the information in data store 250 may be distributed in any suitable manner across one or more data stores for storage (which may be hosted externally).

In embodiments, data stored in data store 250 includes reference facial images that are utilized to select similar facial images. In some embodiments, the reference facial images also include base facial images selected for faceless input images. These reference facial images used for selecting a base facial image may be the same images or different images than the ones used for selecting similar facial images. Data store may also be used to store one or more neural networks utilized by components of identity obfuscation manager 200, such as input face detector 210, new facial image synthesizer 220, base face selector 270, and, in some embodiments, input image updater 240.

Generating a New User Facial Image and Updating Input Image

Figure 17:
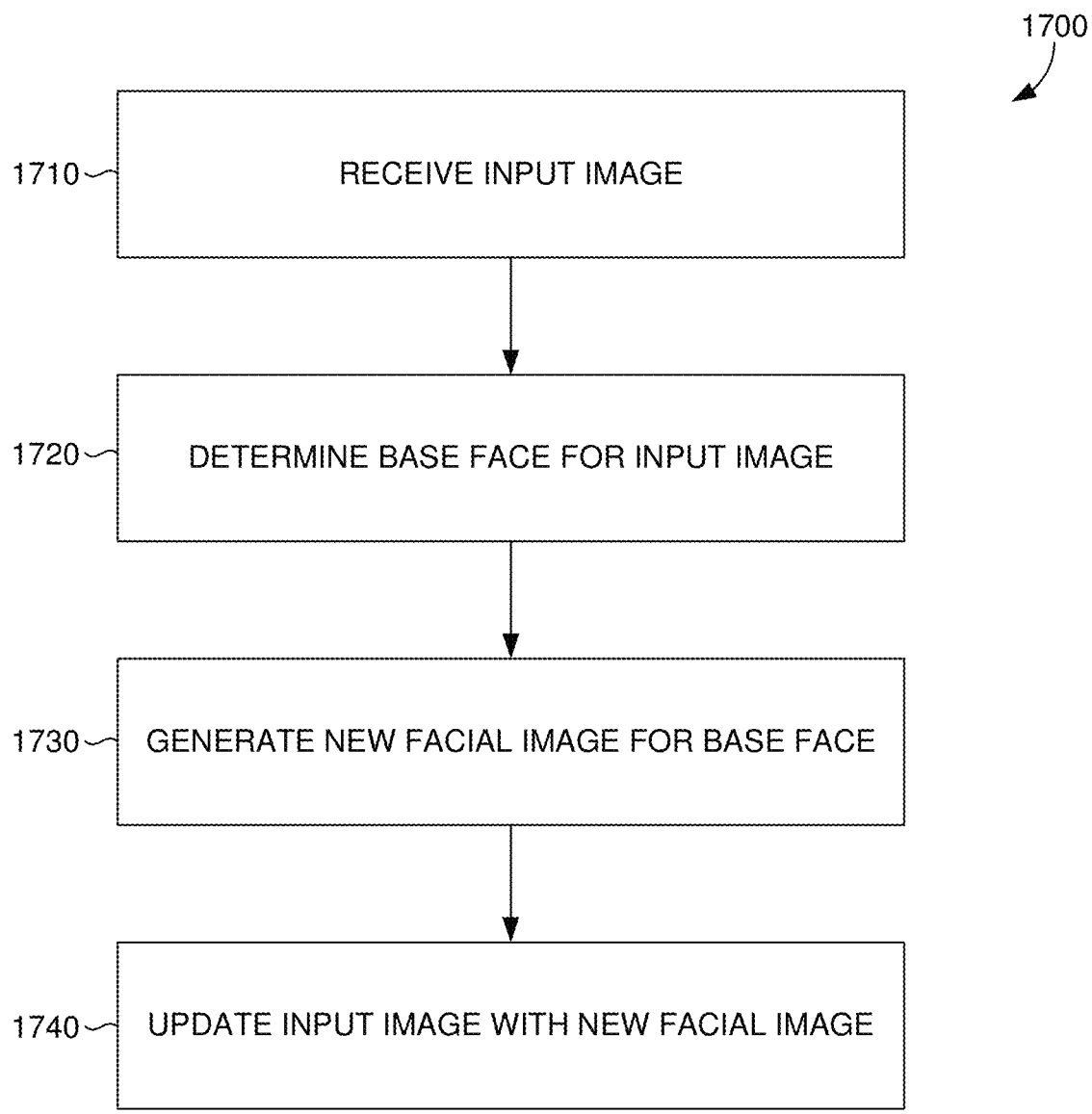
FIG. 17 depicts an example method for updating an input image with a new user facial image, in accordance with embodiments of the present invention.

With reference to FIG. 17, a flow diagram is provided to show an embodiment of a method 1700 for generating a new facial image for an input image, in accordance with embodiments of the present invention. Embodiments of method 1700 is be performed, for example, by one or more components of identity obfuscation manager 200 in FIG. 2. Method 1700 and other methods disclosed herein, such as methods 1800 and 1900, may be performed by various modules as indicated below. In some embodiments, some or all of these modules correspond to different functions performed by the same hardware components, such as the same processor on a computing device, which may be a user device or a remote server. Additionally or alternatively, some or all of these modules correspond to different hardware components, such as different processors on the same or different computing devices.

As such, at block 1710, an input image is received. Embodiments of block 1710 are performed by a receiving module. The input image depicts at least part of a person, such as a person's face and/or body. In some embodiments, the input image is received by accessing a camera on a user device, such as user device 102a of FIG. 1, where the user takes the input image with the camera. In other aspects, the input image is selected by a user from a repository, for example, stored in a data store, such as database 112, accessible by a network or stored locally at the user device. An image may also be received by a user inputting a link or URL to the image.

At block 1720, a base face is determined for the input image. Embodiments of block 1730 are performed by a base face determining module. Base face determining module determines the base face for an input image either by detecting a face that is depicted in the input image or, upon determining that no face is detected in the input image, selecting a base face for the input image out of a set of reference facial images. As such, embodiments of the base face determining module comprise aspects of input face detector 210 and/or base face selector 270 of identity obfuscation manager 200 in FIG. 2. Detecting a base face within an input image at block 1720 includes determining a bounding box defining the area of the input image in which ha face is depicted and, in some embodiments, determining one or more landmarks of the face within the bounding box. Detecting a base face within an input image is done by applying a face detection technique, such as utilizing an MTCNN network, other CNNs, HOG, PCA, eigenfaces, for example. Further details of some embodiments of block 1720 are described in conjunction without input face detector 210 of FIG. 2. Embodiment of block 1720 where the base face is selected from reference facial images is depicted further in method 1900 of FIG. 19 as described below.

At block 1730, based on the determined base face, a new facial image is generated from similar facial images. Embodiments of block 1730 are performed by a new facial image generating module, which may be an embodiment of new facial image synthesizer 220 of FIG. 2. The new facial image that is generated is a combination of the similar facial images that are selected out of reference facial images as being most similar to the base face relative to the other reference facial images. As such, embodiments of block 1730 may include selecting the similar facial references from a set of reference facial images, aligning the similar facial images, and combining the similar facial images.

In one embodiment, facial features are extracted from the base face and compared to facial features extracted from each reference facial image to determine a similarity measure between the base face and each reference facial image. In some embodiments, the similarity measure is the Euclidean distance between vectors representing the facial features of the base face and the reference facial image. In exemplary embodiments, six of the reference facial images are selected to form a set of similar facial images for an input image. An embodiment of block 1730 is depicted further in FIG. 18.

At block 1740, the input image is updated to have a combination of the new facial image and the base face. Embodiment of block 1740 are performed by an updating module. In exemplary aspects, block 1740 includes combining the new facial image and the base face and then updating the input image with this combination of the new facial image and the base face. As such, some embodiments of updating module performing block 1740 include aspects of user facial image generator 230 and/or input image updater 240 of FIG. 2. In exemplary aspects, the new facial image and the base face are aligned, which may include a similar process as aligning the similar facial images (such as the process described below at block 1830 of FIG. 18), and once aligned, the new facial image and the base face are blended together. Blending the base face and the new facial image includes overlaying one of the images, such as the new facial image, over the other, such as the base face, and performing alpha blending. The resulting combination may be referred to as a new user facial image.

Further, the new user facial image may then be combined with the input image by aligning the new user facial image with a face position in the input image and blending the images. Where the input image originally depicted a face that was detected, the new user facial image is aligned with the facial region detected in the input image. This is done in a similar manner described for aligning the new facial image and the base face. Where the input image does not depict a face and a base face is selected from a reference set of images, pose keypoints are estimated for the new user facial image and the input image, and the neck key points for each image are aligned together. The new facial image and base face combination are aligned adjacent the rest of the body in the input image so that the face depicted in the resulting updated image is at a realistic position with respect to the rest of the body. Once aligned, a blending processes, such as Poisson blending, is performed to create a seamless transition between the newly created new user facial image and the input image. In exemplary aspects, the updated input image is provided to a user on a graphical user interface, such as graphical user interface 2000 of FIGS. 20A and 20B described below. In some embodiments, the updated input image is modified based on user input, such as adjustment of an alpha blending level, after being initially presented to the user.

Figure 18:
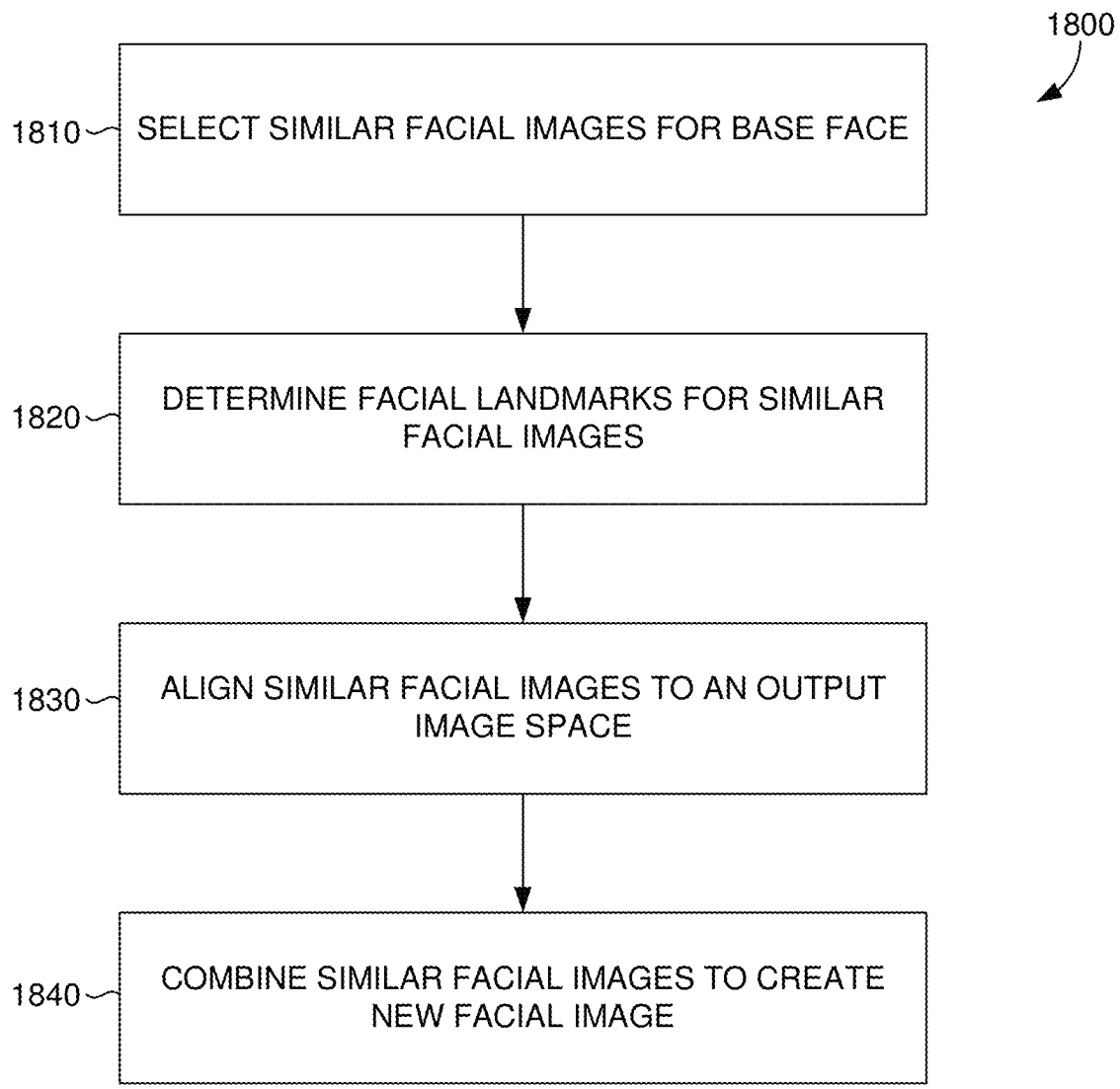
FIG. 18 illustrates an example method for generating a new user facial image, in accordance with embodiments of the present invention.

FIG. 18 depicts an example method 1800 for generating the new facial image at block 1730 of FIG. 17 in accordance with embodiments of the disclosure. At least some aspects of method 1800 are performed by a new facial image generating module, which may be an embodiment of new facial image synthesizer 220 described in conjunction with FIG. 2.

At block 1810, a set of similar facial images are selected for the base face. In exemplary embodiments, the similar facial images are selected automatically based on a comparison of the facial features of the base face and the facial features of reference facial images, which may be considered candidates for selection as the similar facial images. In one embodiment, facial features are extracted using a deep learning neural network, and there may be 512 features extracted from each image (i.e., the base face and the reference facial images). For each pair comprising the base face and a reference facial image, a similarity measure is computed based on the extracted facial features. In some embodiments, the similarity measure is the Euclidean distance between vectors representing the facial features of the base face and the reference facial image, where greater Euclidean distance measurements indicate less similarity. In exemplary embodiments, a predetermined number of reference facial images are determined to be most similar to the base face (such as having the lowest Euclidean distance measurement) and are selected to form a set of similar facial images for an input image. In one embodiment, there are six similar facial images selected for the base face.

At block 1820, facial landmarks are determined for each selected similar facial images. In one embodiment, facial landmarks are determined by inputting HOG features of the similar facial image into a linear support vector machine. In some embodiments, facial landmarks for the similar facial images are determined for the reference facial images prior to selection as a similar facial image and are stored in association with the reference facial images. As such, some embodiments of block 1820 include determining the facial landmarks by accessing the stored information. Alternatively, the facial landmarks are determined at runtime after selection of the similar facial images.

At block 1830, the similar facial images are aligned and warped to an output image space. In exemplary aspects, fixed pixel locations for each facial landmark within the output image space are identified by averaging the pixel locations of the facial landmark in the similar facial images. The facial landmarks of the similar facial images are then warped to the fixed pixel locations of the corresponding facial landmarks in the output image space. Further, in some embodiments, triangulation is applied, and triangular regions of the similar facial images are warped to align with triangular regions of the output image space.

At block 1840, the aligned similar facial images are combined to form a new facial image. In exemplary embodiments, the similar facial images are combined by, at each pixel location, averaging the pixel intensities of the similar facial images. In some embodiments, a weighted average is applied to the pixel intensities, where the weight of each similar facial image may correspond to the similarity measure (e.g., Euclidean distance) between that similar facial image and the base face. The newly created facial image may then be combined with the base face and the input image as described in FIG. 17.

Figure 19:
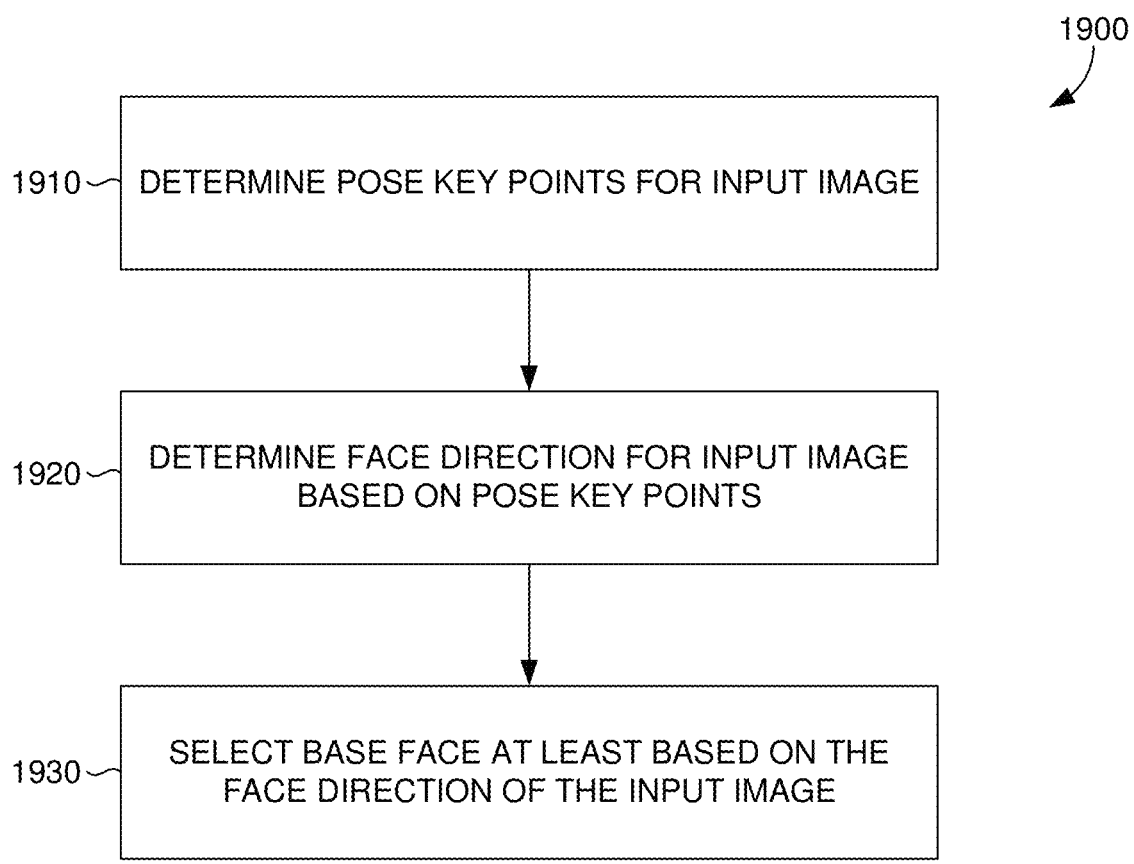
FIG. 19 illustrates an example method selecting a base facial image, in accordance with embodiments of the present invention.

Turning to FIG. 19, a method 1900 for selecting a base face for an input image is depicted in accordance with embodiments of the disclosure. Method 1900 is performed by a base face determining module that includes aspects of base face selector 270 described in conjunction with FIG. 2. Embodiments of method 1900 are performed upon determining that a received input image does not include a face, which may be determined from unsuccessfully attempting to automatically detect a face or from user input indicating the input image does not have a visible face.

At block 1910, pose keypoints are determined for the portion of a person's body that is depicted in the input image. In some embodiments, pose keypoints are determined using a series of neural networks, such as the COCO model. At block 1920, a face direction is determined for the input image based on the pose keypoints. A face direction is the likely direction that a face on the body depicted in the input image would be facing. Examples of a face direction include, but are not limited to, front facing, left side facing, right side facing, and backward facing. In some embodiments, the face direction is determined using a trained neural network.

At block 1930, a base face is selected from a set of reference facial images at least based on the face direction of the input image. In exemplary embodiments, each reference facial image is labeled with a face direction, which may be determined automatically (similar to determining a face direction for the input image) or manually, and the reference facial images are filtered according to face direction such that a reference facial image labeled with the same face direction as the input image is selected.

Some embodiments of block 1930 include selecting the base face based on additional factors, such as gender and/or skin color. As such, some embodiments of method 1900 include determining a gender and/or skin color for the input image. In some embodiments, gender is determined automatically using machine learning or applying a set of heuristic rules. In one embodiment, a CNN model is utilized to automatically determine gender. Alternatively, gender may be determined based on user input. For example, in one implementation, a user inputs an indication of a gender to assigned to the person depicted in the input image. Gender is either similarly automatically assigned or manually assigned to the reference facial images, and the reference facial images are filtered according to gender such that the gender of the selected base face matches the gender determined for the input image.

In embodiments utilizing skin color, a skin color is determined for the input image either automatically or through a user input. In some embodiments, skin color for an input image is determined by converting the input image to a predefined skin color range in the YCrCb color domain and determining the most predominantly present color, relative to other colors in the domain, within the input image. The predominately present color is automatically selected as the skin color for the input image. In alternative implementations, a user selects the skin color or otherwise manually indicates the skin color. Skin color is similarly automatically or manually assigned to the reference facial images, and the reference facial images are filtered according to skin color such that the skin of the selected base face matches or is within a predefined range within the skin color determined for the input image. In some embodiments, the base face is selected using face direction and skin color. In other embodiments, the base face is selected using face direction and gender. And in further embodiments, the base face is selected using face direction, skin color, and gender.

Providing New User Facial Image

Figure 20A:
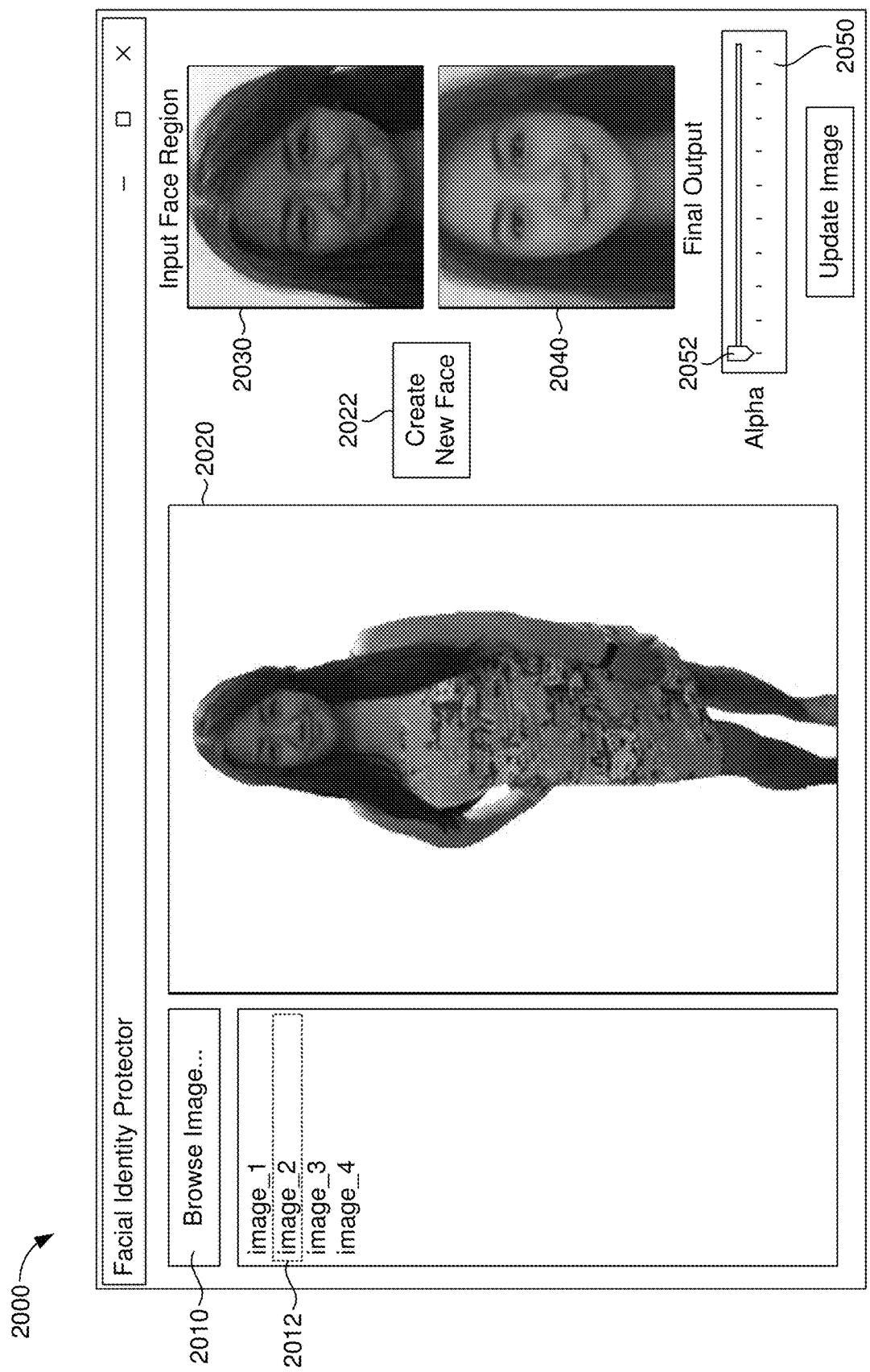
FIGS. 20A-20B depict screenshots of an example graphical user interface for obscuring facial identity in a user input image, in accordance with various embodiments of the disclosure.
Figure 20B:
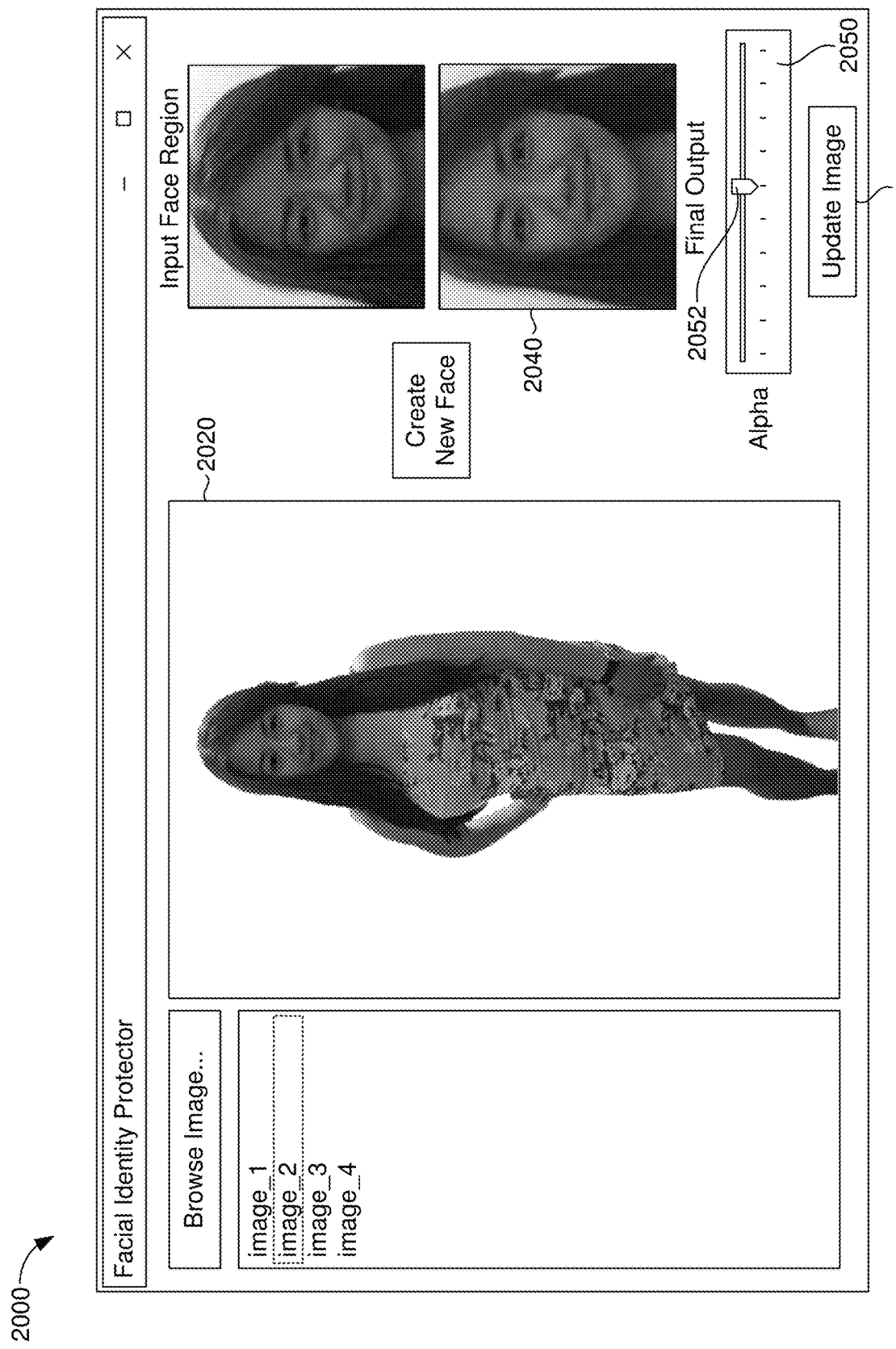

FIGS. 20A and 20B depict example screenshots from a computing device showing aspects of an example graphical user interface (GUI) 2000 for obfuscating a user's facial identity in accordance with embodiments of the disclosure. In FIG. 20A, GUI 2000 shows that an input image has been selected and a new user facial image is created. Specifically, a selectable browse image button 2010 may be selected by a user to view possible image to input. Here, GUI 2000 shows that image file 2012 is selected. GUI 2000 includes an input image display 2020, which displays the input image selected by the user. GUI 2000 further includes a selectable button 2022 to initiate creation of a new face for the input image. As depicted in FIG. 20A, some embodiments of GUI 2000 include an input face display 2030 that shows a base facial image extracted from an input image. Where an input image does not include a face, input face display 2030 may be empty or may display a base facial image selected for the faceless input image.

GUI 2000 also includes a final face display 2040, which shows a new user facial image. This new user facial image of final face display 2040 is a combination of a newly synthesized facial image, which may be created by an embodiment of new facial image synthesizer 220 of FIG. 2 and as described with respect to method 1800, and the base face, which is displayed here in input face display 2030. In exemplary embodiments, the new user facial image is created by overlaying the new facial image over the base face and applying an alpha blending level. GUI 2000 includes an alpha blending scale 2050 with a slider 2052 indicating the amount of alpha blending being applied. In FIG. 20A, the slider is set at 0 such that the new user facial image of final face display 2040 has only visible characteristics of the new image synthesized without the extracted base face. FIG. 20B depicts slider 2052 being moved along the alpha blending scale 2050 so that more blending is applied. As a result, the new user facial image of final face display 2040 in FIG. 20B shows more aesthetics of the base face from input face display 2030. This movement of slider 2052 may be done by user input. In this way, a user has the ability to determine how much the new user facial image resembles the face in the original input image and how much of the original face is obscured to protect the facial identity.

Further, in FIG. 20B, input image display 2020 has been modified after selection of selectable button 2060 to update the input image. As such, input image display 2020 in FIG. 20B includes the body of input image aligned with the face of the final face display 2040. Additional blending and color correction may also be performed to create a seamless transition between the original parts of the input image and the newly synthesized parts.

Exemplary Operating Environment

Figure 21:
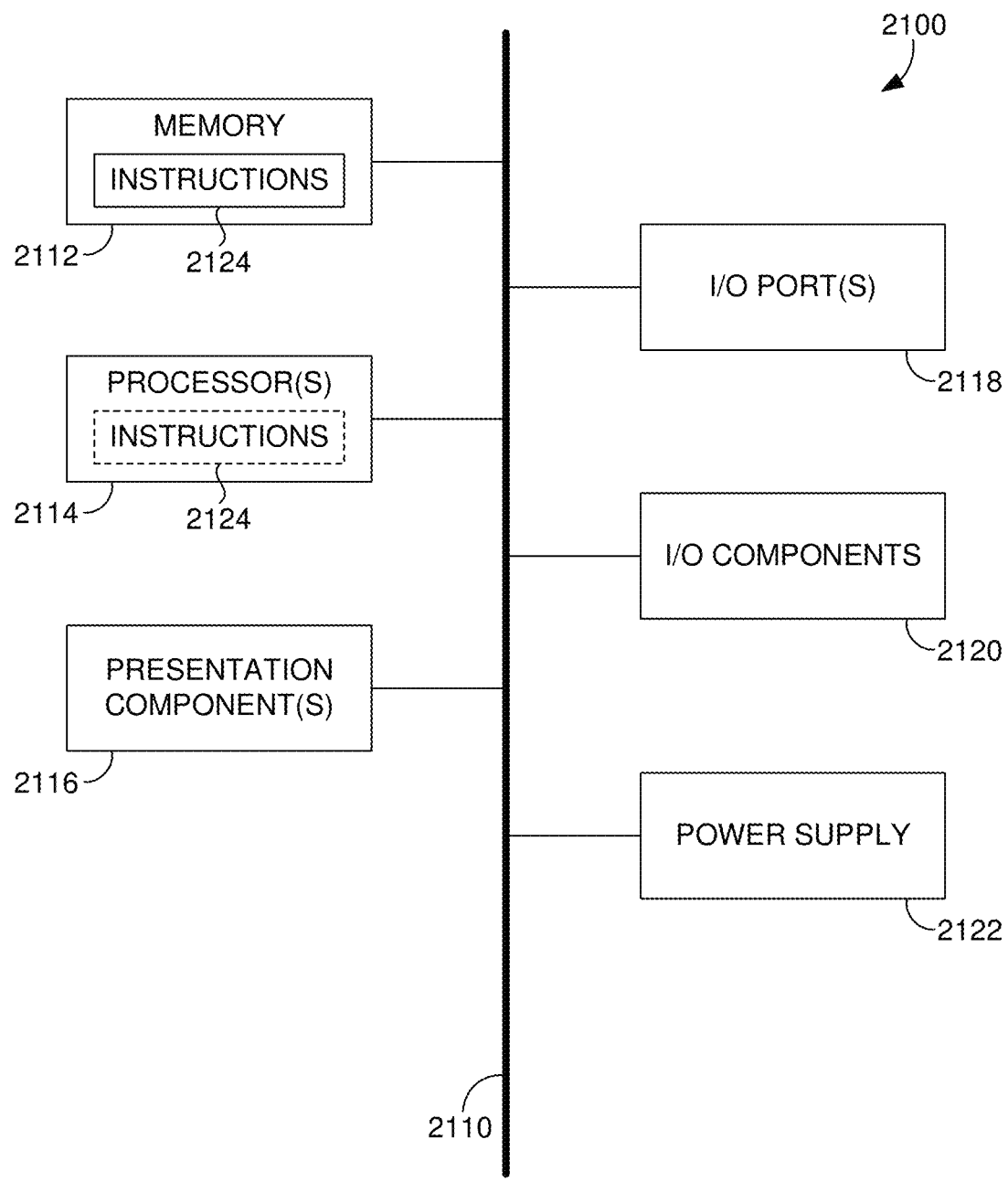
FIG. 21 depicts a block diagram representing an example computing device in which embodiments of the present disclosure may be employed.

Having described embodiments of the present invention, FIG. 2100 provides an example of a computing device in which embodiments of the present invention may be employed. Computing device 2100 includes bus 2110 that directly or indirectly couples the following devices: memory 2112, one or more processors 2114, one or more presentation components 2116, input/output (I/O) ports 2118, input/output components 2120, and illustrative power supply 2122. Bus 2110 represents what may be one or more busses (such as an address bus, data bus, or combination thereof). Although the various blocks of FIG. 21 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 21 is merely illustrative of an exemplary computing device that can be used in connection with one or more embodiments of the present invention. Distinction is not made between such categories as "workstation," "server," "laptop," "handheld device," etc., as all are contemplated within the scope of FIG. 21 and reference to "computing device."

Computing device 2100 typically includes a variety of computer-readable media. Computer-readable media can be any available media that can be accessed by computing device 2100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 2100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 2112 includes computer storage media in the form of volatile and/or nonvolatile memory. As depicted, memory 2112 includes instructions 2124. Instructions 2124, when executed by processor(s) 1014 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 2100 includes one or more processors that read data from various entities such as memory 2112 or I/O components 2120. Presentation component(s) 2116 present data indications to a user or other device. Exemplary presentation components 2116 include a display device, speaker, printing component, vibrating component, etc.

I/O ports 1018 allow computing device 2100 to be logically coupled to other devices including I/O components 2120, some of which may be built in. Illustrative components include a microphone, joystick, game pad, satellite dish, scanner, printer, wireless device, etc. I/O components 2120 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 2100. Computing device 2100 may be equipped with depth cameras, such as stereoscopic camera systems, infrared camera systems, RGB camera systems, and combinations of these, for gesture detection and recognition. Additionally, computing device 2100 may be equipped with accelerometers or gyroscopes that enable detection of motion. The output of the accelerometers or gyroscopes may be provided to the display of computing device 2100 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

What is claimed is:

1. A computerized method comprising:
  receiving, at a receiving module, an input image depicting at least part of a person;
  determining, at a base determining face module, a base face for the input image;
  determining that a set of similar facial images are similar to the base face;
  generating, at a new facial image generating module, a new facial image based on the base face, the new facial image comprising a combination of the similar facial images within the set of similar facial images; and
  providing, at an updating module, an updated input image comprising a combination of the new facial image and the base face.

2. The computerized method of claim 1, wherein the base face comprises a face detected within the input image, and wherein the combination of the new facial image and the base face comprises the new facial image and the base face aligned to overlay one another in the updated input image.

3. The computerized method of claim 2, wherein alpha blending is applied when the new facial image and the base face aligned to overlay one another.

4. The computerized method of claim 1, wherein the base face comprises a base facial image selected from a set of reference facial images.

5. The computerized method of claim 1, wherein generating the new facial image comprises:
  detecting facial landmarks within each similar facial image,
  identifying a fixed pixel location for each facial landmark within an output image space for the new facial image, the fixed pixel locations being identified based on pixel locations of facial landmarks of the similar facial images,
  warping the similar facial images to the output image space by aligning facial landmarks on each similar facial image with corresponding fixed pixel locations in the output image space, and
  for each pixel within the output image space, averaging pixel intensities from similar facial images.

6. The computerized method of claim 5, wherein warping the similar facial images to the output image space further comprises applying triangulation to each similar facial image and the output image space and warping the similar facial images into the output image space so that triangular regions of each similar facial image are aligned with corresponding triangular regions of the output image space.

7. The computerized method of claim 1, wherein determining that the set of similar facial images are similar to the base face comprises:
  extracting facial features from the base face,
  comparing facial features extracted from the base face to facial features in a set of reference facial images, and
  selecting the set of similar facial images from the set of reference facial images based on the set of similar facial images being most similar to the base face based on the comparison of facial features.

8. The computerized method of claim 7, wherein comparing facial features extracted from the base face to facial features in the set of reference facial images comprises computing a Euclidean distance measurement between a facial feature vector for the base face and each facial feature vector for the reference facial images.

9. One or more computer storage media storing computer-useable instructions that, when used by a computing device, cause the computing device to perform operations, the operations comprising:
  receiving an input image;
  detecting a face in the input image,
  determining that a set of similar facial images are similar to the face in the input image;
  generating a new facial image based on the face detected in the input image, the new facial image comprising a combination of the similar facial images in the set of similar facial images; and
  providing an updated input image comprising a combination of the new facial image and the face detected in the input image.

10. The one or more computer storage media of claim 9, where generating the new facial image comprises:
  aligning the similar facial images within an output image space; and
  at each pixel location, averaging pixel intensities of the similar facial images.

11. The one or more computer storage media of claim 9, wherein the operations further comprise combining the new facial image and the face detected in the input image by overlaying the new facial image over the face detected in the input image.

12. The one or more computer storage media of claim 11, wherein combining the new facial image and the face detected in the input image includes aligning the new facial image with the face detected in the input image based on facial landmarks of the new facial image and facial landmarks of the face detected in the input image.

13. The one or more computer storage media of claim 11, wherein an amount of alpha blending is applied to the new facial image overlaying the face detected in the input image.

14. The one or more computer storage media of claim 13, wherein the operations further comprise adjusting the amount of alpha blending based on user input.

15. A computer system comprising:
- a receiving module configured to receive an input image, the input image comprising at least part of a body of a person;
- a base face determining module configured to select a base facial image for the input image, the base facial image being selected out of reference facial images based on pose keypoints identified in the input image;
- a new facial image generating module configured to generate a new facial image, wherein generating the new facial image comprises determining that a set of similar facial image are similar to the base face and combining the similar facial images in the set of similar facial images to create the new facial image; and
- an updating module configured to provide an updated input image that includes a combination of the new facial image, the base facial image, and the input image.

16. The computer system of claim 15, wherein the new facial image and the base facial image are aligned to overlay one another adjacent the at least part of the body in the input image.

17. The computer system of claim 15, wherein the base face determining module selects the base facial image by determining a face direction based on the pose keypoints of the input image and selecting the base facial image based on the face direction for the input image.

18. The computer system of claim 15, wherein the base face determining module selects the base facial image further based on a skin color determined for the at least part of the body of the input image.

19. The computer system of claim 15, wherein the base face determining module selects the base facial image further based on a gender determined for the at least part of the body of the input image.

20. The computer system of claim 15, wherein the base face determining module is configured to, prior to selecting the base facial image out of reference facial images, determine that no face is detected in the input image.

* * * * *